(12) United States Patent
Lin et al.

(10) Patent No.: US 12,273,321 B2
(45) Date of Patent: Apr. 8, 2025

(54) SYSTEMS AND METHODS OF AUTONOMOUSLY IMPLEMENTING FIREWALL RULES

(71) Applicant: Avaya Management L.P., Durham, NC (US)

(72) Inventors: Lin Lin, Tottenham (CA); Ping Lin, Tottenham (CA)

(73) Assignee: Avaya Management L.P., Durham, NC (US)

( * ) Notice: Subject to any disclaimer, the term of this patent is extended or adjusted under 35 U.S.C. 154(b) by 635 days.

(21) Appl. No.: 17/487,578

(22) Filed: Sep. 28, 2021

(65) Prior Publication Data

US 2023/0106840 A1    Apr. 6, 2023

(51) Int. Cl.
*H04L 9/40* (2022.01)
*G06F 9/455* (2018.01)

(52) U.S. Cl.
CPC ...... *H04L 63/0263* (2013.01); *G06F 9/45558* (2013.01); *H04L 63/0236* (2013.01); *H04L 63/20* (2013.01); *G06F 2009/45595* (2013.01)

(58) Field of Classification Search
CPC . H04L 63/0263; H04L 63/20; H04L 63/0236; G06F 9/45558; G06F 2009/45595
See application file for complete search history.

(56) References Cited

U.S. PATENT DOCUMENTS

| | | | |
|---|---|---|---|
| 11,700,190 B2 * | 7/2023 | Yadav | H04L 41/0894 718/1 |
| 2017/0250951 A1 * | 8/2017 | Wang | H04L 41/0893 |

OTHER PUBLICATIONS

Navarikuth et al. "A dynamic firewall architecture based on multi-source analysis," CSI Transactions on ICT, 2013, vol. 1, No. 4, pp. 317-329.

* cited by examiner

*Primary Examiner* — Paul E Callahan
(74) *Attorney, Agent, or Firm* — Sheridan Ross P.C.

(57) ABSTRACT

Systems and methods for automatically configuring a firewall are described. Systems and methods include receiving one or more flows, automatically detecting elements of a computing environment, automatically generating a firewall configuration based on the detected elements of the computing environment and the received one or more flows, and automatically configuring a firewall within the computing environment with the firewall configuration.

20 Claims, 9 Drawing Sheets

Customer 34 — 303

| Hostname | IP Address | Product |
|---|---|---|
| wall34dc9aads1 | 100.72.134.71 | AADS |
| wall34dc9aads2 | 100.72.134.72 | AADS |
| wall34dc9c1 | 100.72.134.40 | IXM |
| wall34dc9dp | 100.72.134.90 | WDC |

FIG. 3B

Deploy — 300

Customer number: [34]
Customer name: [Wall]
Number of UC users: [4000]
Number of CC users: [ ]
Template: [ACP_Template_0_2]
Networking:
[X] Custom Data center 1: [ ]
[ENG NAR2]
Agent: [10.130.118.14]
Data center 2: [ ]
Agent: [ ]
Root folder: [ ]

[ ] SBC B1   [ ] SBC B2

[Submit]

FIG. 3A

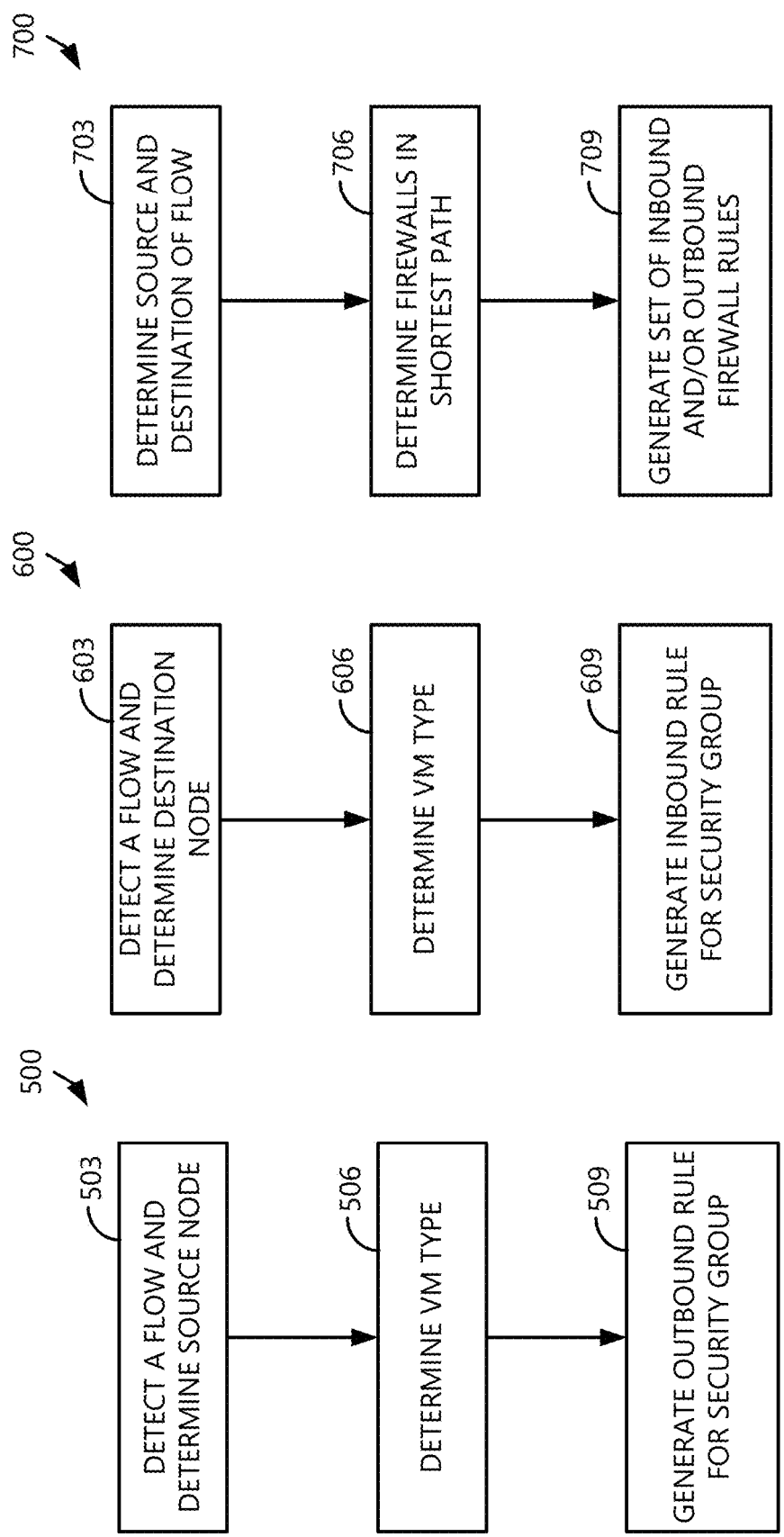

SYSTEMS AND METHODS OF AUTONOMOUSLY IMPLEMENTING FIREWALL RULES

FIELD

The disclosure relates generally to security of computer networks and in particular to implementing firewall rules.

BACKGROUND

Today's computer networks utilize various levels of security. The security measures may include implementing one or more firewalls to detect unwanted use of ports in a computer network. However, conventional firewalls require sets of rules to designate what types of packets may be received by particular ports. Such rules are created inefficiently and are inevitably full of holes resulting in insecure or overly secure systems.

In the case of data centers which are built over time, systems do not always have the same network design. The choice of firewall is often a function of the data center or cloud provider. For example, some datacenters may use Palo Alto firewalls while others use Fortinet. Some datacenters may use their own system of security groups and network access control lists. The wide variety of types of firewalls results in more complexity and creating firewall rules for such networks results in greater inefficiencies.

In the case newly created networks of servers and/or virtual machines, deploying such servers and/or virtual machines requires a large amount of time, for example months, with a concerted effort of trained computer science professionals to debug firewall problems. In such scenarios, firewall rules are often written by hand in an inefficient and inaccurate manner. When a set of interacting virtual machines are deployed in a datacenter, for example, one or more firewalls must be configured with rules to allow data to flow as required through the datacenter. Firewall rules are dependent on network topology, firewall location, and are specific to firewall vendor. Firewall rules are, using contemporary methods, painstakingly developed over many weeks.

Manually written firewall rules are not error-free. Inevitably, a firewall configured with handwritten rules will block wanted traffic and include holes allowing unwanted traffic through. Moreover, modern computing systems, such as datacenters, often must be deployed at a moment's notice. As additional elements, such as media servers, are added to a network, firewall configurations must be updated accordingly. Using conventional systems, it is impossible to safely deploy a network of computing devices with implemented firewalls within a satisfactory amount of time. As a result, computing systems and networks such as datacenters cannot be deployed without excessive delay. And even once deployed, the firewalls within such computing systems and networks will be inaccurately configured. Any delay in the configuration of a firewall for a network may result in the network being breached by a computer virus or other threat.

What is needed is an improvement in computer functionality which enables a computing system or network to be deployed with an accurately configured firewall automatically based only on a minimum amount of data.

BRIEF DESCRIPTION OF THE DRAWINGS

FIGS. 3A and 3B are illustrations of user interfaces in accordance with one or more embodiments of the present disclosure;

FIGS. 4-7 are flow diagrams of processes for autonomously creating firewall rules in accordance with one or more embodiments of the present disclosure;

DETAILED DESCRIPTION

Figure 1:
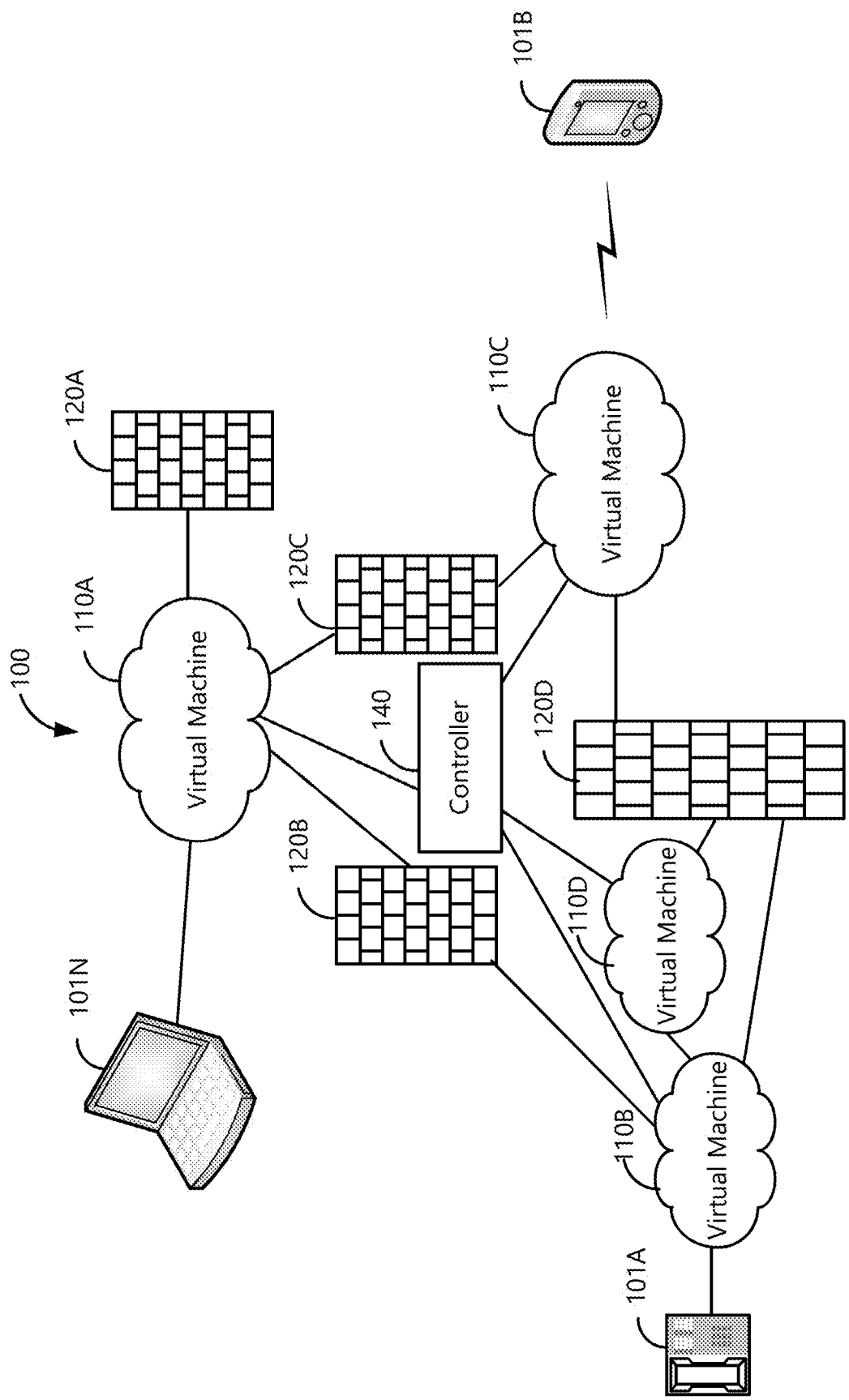
FIG. 1 is a block diagram of an illustrative system for implementing autonomously created firewall rules in accordance with one or more embodiments of the present disclosure.

The above-described issues with conventional systems for establishing and implementing firewall rules for networks may be resolved using systems and methods as described herein. What is needed is an autonomous method of creating a set of firewall rules which can be used in any scenario, regardless of variations in node population, network topology, and firewall vendors. These and other needs are addressed by the various embodiments and configurations of the present disclosure.

The claimed method of configuring a firewall is distinguished from conventional methods of configuring firewalls in that the conventional methods are limited to a laborious and time-consuming manual process of writing firewall rules. Manually written firewall rules are not error-free. Inevitably, a firewall configured with handwritten rules will block wanted traffic and include holes allowing unwanted traffic through. Moreover, modern computing systems, such as datacenters, often must be deployed at a moment's notice. As additional elements, such as media servers, are added to a network, firewall configurations must be updated accordingly. Using conventional systems, it is impossible to safely deploy a network of computing devices with implemented firewalls within a satisfactory amount of time. As a result, computing systems and networks such as datacenters cannot be deployed without excessive delay. And even once deployed, the firewalls within such computing systems and networks will be inaccurately configured. Any delay in the configuration of a firewall for a network may result in the network being breached by a computer virus or other threat.

What is needed is an improvement in computer functionality which enables a computing system or network to be deployed with an accurately configured firewall automatically based only on a minimum amount of data.

As described herein, a configured firewall may be launched with no or only flow definitions and configured and adapted on-the-fly. The systems and methods described herein employ a system of using flows that enable a firewall configuration system to do things it could not do before. The same [computer devices] can be immediately placed within any type of network having any variety of combinations of firewalls, subnetworks, and devices, and using a system and method as described herein, the firewall or firewalls within the network may be automatically configured at a moment's notice at an accuracy beyond the capabilities of humans. The systems and methods described herein allow for a firewall to be automatically tailored for different networks and ensure that threats can be stopped by the firewall starting from the time the network is deployed. The fact that the systems and methods of configuring firewalls as described herein are capable of being automatically and immediately updated based on changes to a network allows the systems and methods to deploy a fully and accurately configured firewall at the time a network is deployed without delay.

The following presents a simplified summary of one or more embodiments in order to provide a basic understanding of the one or more embodiments and is intended to neither identify key elements of the embodiments nor delineate the scope of such embodiments. Its sole purpose is to present some concepts of the described embodiments in a simplified form as a prelude to the more detailed description presented below.

According to one or more embodiments of the present disclosure, a method of automatically configuring a firewall may be implemented. The method may comprise receiving one or more flows, automatically detecting elements of a computing environment, automatically generating a firewall configuration based on the detected elements of the computing environment and the received one or more flows, and automatically configuring a firewall within the computing environment with the firewall configuration. The one or more flows may indicate allowable flows of data between computing devices. Detecting the elements of the computing environment may comprise detecting one or more media servers within the computing environment. In some embodiments, the method may further comprise generating firewall rules and initializing firewalls prior to deploying a virtual machine. Generating the firewall configuration may comprise generating a plurality of firewall rules based on the received one or more flows. In some embodiments the method may comprise configuring a second firewall within a second computing environment based on the one or more flows and/or receiving an address feed, wherein the firewall configuration is generated further based on the address feed.

In some embodiments, a method for establishing a set of firewall rules may be implemented to overcome the aforementioned deficiencies of contemporary methods of creating firewall rules. The method comprises detecting, by a processor, a flow of packets and, in response to detecting the flow, determining, by the processor, a source of the flow and a destination of the flow. The source of the flow may be converted into a first firewall zone and the destination of the flow may be converted into a second firewall zone, for example by executing a series of data lookups in memory. Finally, a firewall rule is generated based on the first firewall zone and the second firewall zone.

According to some aspects of the aforementioned method, the method may include determining a source node associated with the flow is a virtual machine and, based on the determination that the source node is a virtual machine, determining a type of the virtual machine. In this way, an outbound rule for a security group associated with the type of the virtual machine may be generated.

According to some aspects of the aforementioned method, the method may include determining a destination node associated with the flow is a virtual machine and, based on the determination that the destination node is a virtual machine, determining a type of the virtual machine. In this way, an inbound rule for a security group associated with the type of the virtual machine may be generated.

According to some aspects of the aforementioned method, the method may include determining the source of the flow is associated with a first firewall and the destination of the flow is associated with a second firewall different from the first firewall and, based on the determination that the source of the flow is associated with the first firewall and the destination of the flow is associated with the second firewall different from the first firewall, determining a shortest path from the first firewall to the second firewall. In some embodiments, a set of inbound firewall rules may be generated based on the shortest path from the first firewall to the second firewall. In some embodiments, a set of outbound firewall rules may be generated based on the shortest path from the first firewall to the second firewall.

Embodiments of the present disclosure include a method for establishing a set of firewall rules, the method comprising: receiving, with a processor, an abstract description of network traffic; translating, with the processor, the abstract description of network traffic to one or more of security and NAT rules in terms of allowable flows, wherein the flows are invariant with respect to one or more of firewall architecture, vendor, network topology, as well as to a number of servers; and loading the one or more of security and NAT rules into firewalls in a computing environment.

Aspects of the above method include the method further comprising: selecting relevant flows; and determining a concrete form for each relevant flow for the computing environment by querying a deployment automation system.

Aspects of the above method include the method further comprising generating firewall rules and initializing firewalls prior to deploying a virtual machine.

Aspects of the above method include wherein the one or more firewalls are invariant based on the network topology.

Aspects of the above method include wherein a source and a destination of the network traffic are within a network of virtual machines, wherein the firewall rules are generated prior to deployment of the virtual machines.

Aspects of the above method include the method further comprising: determining a source of a first flow is a virtual machine; determining a type of the virtual machine; and generating an outbound rule for a security group associated with the type of the virtual machine.

Aspects of the above method include wherein if the source and destination of a flow falls within the same zone, no security rule is generated; if a flow calls for bidirectional connectivity between source and destination, a security rule is generated to cover each direction; and if a flow calls for mesh connectivity between source and destination, an optimized single bidirectional security rule is generated instead of rules between all pairs of source and destination entities.

Aspects of the above method include the method further comprising: determining a destination of a first flow is a virtual machine; determining a type of the virtual machine; and generating an inbound rule for a security group associated with the type of the virtual machine.

Embodiments include a user device comprising: a processor; and a computer-readable storage medium storing computer-readable instructions which, when executed by the processor, cause the processor to: receive an abstract description of network traffic; translate the abstract description of network traffic to one or more of security and NAT rules in terms of allowable flows, wherein the flows are invariant with respect to one or more of firewall architecture, vendor, network topology, as well as to a number of servers; and load the one or more of security and NAT rules into firewalls in a computing environment.

Aspects of the above user device include wherein the computer-readable instructions further cause the processor to: select relevant flows; and determine a concrete form for each relevant flow for the computing environment by querying a deployment automation system.

Aspects of the above user device include wherein the computer-readable instructions further cause the processor to generate firewall rules and initialize firewalls prior to deploying a virtual machine.

Aspects of the above user device include wherein the one or more firewalls are invariant based on the network topology.

Aspects of the above user device include wherein a source and a destination of the network traffic are within a network of virtual machines, wherein the firewall rules are generated prior to deployment of the virtual machines.

Aspects of the above user device include wherein the computer-readable instructions further cause the processor to: determine a source of a first flow is a virtual machine; determine a type of the virtual machine; and generate an outbound rule for a security group associated with the type of the virtual machine.

Aspects of the above user device include wherein the computer-readable instructions further cause the processor to: determine a destination of a first flow is a virtual machine; determine a type of the virtual machine; and generate an inbound rule for a security group associated with the type of the virtual machine.

Embodiments include a computer program product comprising: a non-transitory computer-readable storage medium having computer-readable program code embodied therewith, the computer-readable program code configured, when executed by a processor, to: receive an abstract description of network traffic; translate the abstract description of network traffic to one or more of security and NAT rules in terms of allowable flows, wherein the flows are invariant with respect to one or more of firewall architecture, vendor, network topology, as well as to a number of servers; and load the one or more of security and NAT rules into firewalls in a computing environment.

Aspects of the above computer program product include wherein the computer-readable program code is further configured to: select relevant flows; and determine a concrete form for each relevant flow for the computing environment by querying a deployment automation system.

Aspects of the above computer program product include wherein the computer-readable program code is further configured to cause the processor to generate firewall rules and initialize firewalls prior to deploying a virtual machine.

Aspects of the above computer program product include wherein the one or more firewalls are invariant based on the network topology.

Aspects of the above computer program product include wherein a source and a destination of the network traffic are within a network of virtual machines, wherein the firewall rules are generated prior to deployment of the virtual machines.

Aspects of the above computer program product include wherein the computer-readable program code is further configured to: determine a source of a first flow is a virtual machine; determine a type of the virtual machine; and generate an outbound rule for a security group associated with the type of the virtual machine.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be material.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6.

Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

FIG. 1 is a block diagram of a first illustrative system 100 for implementing a network with autonomously created firewall rules in accordance with one or more of the embodiments described herein. While the system 100 is illustrated as a network with a number of virtual machines ("VMs") 110A-D, it should be appreciated that the system 100 may be implemented using a number of servers in addition to or instead of the VMs 110A-D. As described herein, a VM may in some embodiments be interchangeable with a server or computer system and the same or similar methods and systems may be implemented using networks of VMs or servers or a combination thereof.

As illustrated in FIG. 1, a VM 110A-C may be in communication with one or more user devices 101A, B, N. Each VM 110A-C may be in communication with each of the user devices 101A, B, N either directly, such as a direct connection between a VM 110A to a user device 101N such as a personal computer or over a network connection between a VM 110B through one or more firewalls 120A-D to a user device 101B such as a smartphone or tablet. In some scenarios, two VMs 110B, 110D may be deployed behind common firewalls 120B, 120D such that the VMs 110B, 110D may communicate directly without traversing packets through any of the firewalls 120A-D.

A controller 140 may be a process running on a computer system. The controller 140 may receive firewall rules for the VMs 110A-D. In some embodiments, the controller 140 may interact with one or more of the VMs 110A-d, or user devices 101A, B, N. The controller 140 may be configured to build one or more rules tables containing firewall rules as described in more detail below. The controller 140 may store a copy of all firewall rules in memory.

The controller 140 may be configured to intercept or detect packets or flows of packets sent from or to each VM 110A-D in the system 100. The controller 140 may be capable of analyzing each packet or flow of packets to determine information such as destination and source.

Instances of the firewalls 120A-D may be configured for each respective VM 110A-D. Each firewall 120A-D may store a table of firewall rules applying to each VM 110A-D. In some embodiments, one table of firewall rules for every firewall in the system 100 may be stored in memory accessible by the controller 140.

The communication devices 101A, B, N can be or may include any device that can communicate on a VM 110A-D, such as a Personal Computer (PC), a telephone, a video system, a cellular telephone, a Personal Digital Assistant (PDA), a tablet device, a notebook device, a smart phone, an Internet of Things (IoT) device, and/or the like. As shown in FIG. 1, any number of communication devices 101A, B, N may be connected to any number of VMs 110A-D. The communication devices 101A, B, N are shown in FIG. 1 as communication endpoints. However, the communication devices 101A, B, N may comprise network elements, such as a server, a file server, a router, a Private Branch Exchange (PBX), a conference bridge, a central office switch, a proxy server, a video switch, and/or the like. The VMs 110A-D may be any type of network or system that is created virtually or may be servers or computer systems.

Each VM 110A-D may be an emulation of a computer system. Each of VMs 110A-D may be based on computer architectures and provide functionality of a physical computer. The implementations of VMs 110A-D may involve specialized hardware, software, or a combination. In some embodiments, VMs 110A-D may be system virtual machines (or full virtualization VMs) provide a substitute for a real machine. VMs 110A-D may provide functionality needed to execute one or more operating systems.

The controller 140 may be a hypervisor and may use native execution to share and manage hardware, allowing for multiple environments isolated from one another, yet existing on the same physical machine. The controller 140 may use hardware-assisted virtualization.

With the advent of virtual computing, a user device 101 may be virtualized on a cloud computing system. For example, the user devices 101A, B, N may be running a thin client that connects to a virtualization system that virtualizes the communication devices 101A, B, N and network elements to run on one or more virtual platforms. Each communication device 101A, B, N may run as a virtual thread in the cloud computing system. In this example, the inter connection/communication of the communication devices 101A, B, N is accomplished virtually. In addition, the VMs 110A-D may comprise other virtual elements, such as a Private Branch Exchange (PBX), a router, a proxy server, a session manager, a communication manager, an applications server, a file server, a video switch, a conference bridge, and/or the like that are created as a part of the VMs 110A-D. In some embodiments, a VM 110 may comprise virtual elements and non-virtual elements.

Firewalls 120A-120D can be or may include any hardware coupled with software to provide protection services to a network, such as a Network Address Translator (NAT), a Session Border Controller (SBC), a virus scanner, and/or the like. In FIG. 1, firewalls 120A-120D may be connected to an unsecure network, such as the Internet. Firewalls 120A-120D protect the VMs 110A-110D from security threats. For example, the firewall 120D may be used to isolate a security threat on the VM 110B.

The controller 140 can be or may include any hardware coupled with software that can create and manage a VM 110. The controller 140 can create different processes for other services, such as the firewalls 120A-120D. The VSN manager 140 may run across a plurality of processor cores/servers to generate the VMs 110A-110D.

FIG. 1 shows an original VM 110A that comprises the communication devices 101A, B, N and the firewall 120A. A packet or flow of packets sent to or from the VM 110A may be detected by the controller 140. In some embodiments, the controller 140 may poll a system or device on the network to detect, analyze, or capture a packet or flow.

Based on the packets or flows detected or analyzed by the controller 140, the controller 140 may create one or more firewall rules.

Figure 2:
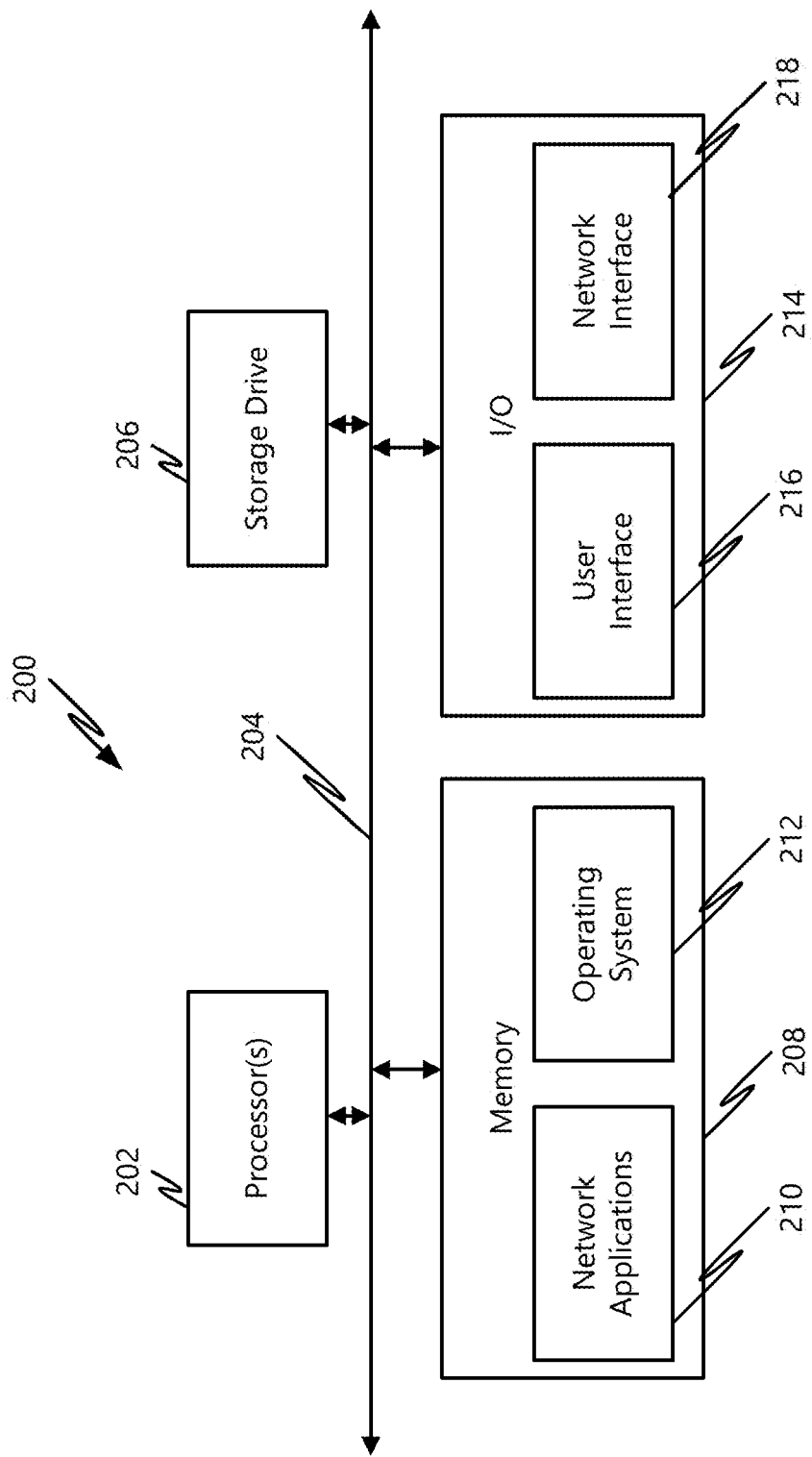
FIG. 2 is a block diagram of a computer system configured to autonomously create firewall rules in accordance with one or more embodiments of the present disclosure.

FIG. 2 is a block diagram of a computer system 200 capable of being configured to autonomously create firewall rules. The computer system 200 may be configured to perform as the controller 140 described herein. The computer system 200 may be implemented in the system 100 of FIG. 1 and may operate as controller 140. The computer system 100 may be a personal computing device, a laptop device, a mobile computing device, a server blade, an Internet appliance, a virtual computing device, a distributed computing device, a cloud-based computing device, or any appropriate processor-driven device.

The computer system 200 may comprise one or more processors 202 connected to a bus 204. The computer system 200 may comprise a storage device 206, memory 208 storing one or more network applications 210 and an operating system 212, and one or more input/output ports comprising a user interface and network interface. The network applications 210 may comprise one or more of a web browser, a mobile application, a networking application, an application configured to deploy one or more VMs, or the like.

Examples of the processor as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARIV1926EJ-S™ processors, other industry-equivalent processors, and may perform computational functions using any known or future-developed standard, instruction set, libraries, and/or architecture.

A processor of a controller as described herein may be capable of obtaining certain aspects of data from a packet or flow of packets. Such data may include a destination of the packet and a source of the packet. The data obtained from packets or flows of packets may be a fairly abstract representation of the flow of data through a network. In practice, a network may comprise a number of VMs grouped behind multiple firewalls and may be made up of a number of subnetworks. Note that while the term VM is used throughout, the systems and methods described herein may apply equally to one or more servers or racks of servers as well as VMs or a combination thereof.

The VMs making up a network must be capable of communicating in specific ways in order for the network to function properly. Firewalls are also a necessity as the network must be secure. The firewalls in the network must be configured such that the VMs may communicate as needed. Typically, one or more administrators write specific rules as to how each VM is connected to the firewalls. Furthermore, each vendor of each firewall and of each type of VM must create a specific set of rules allowing for certain types of data to flow while all other data is blocked. The system of requiring administrators and vendors to manually create firewalls is significantly error prone.

Using systems and methods as described herein, however, using the core idea that the VMs making up a network are required to communicate independent of firewalls, independent of how each VM is connected to each firewall, and independent of the types of firewalls being used in the network, a process of autonomously creating firewall rules may be implemented. Separately considering the two competing factors of how each VM is connected to each firewall, and what is the type of each firewall, a representation of the flows of data or packets may be compiled or otherwise used to generate a set of firewall rules. This set of firewall rules, created by compiling representations of flows, may be downloaded to each firewall.

For system administrators seeking to deploy a rack of servers or VMs. A user such as an administrator may utilize an application executing on a user device with a user interface to select from a list of VM types to be deployed in a network. As illustrated in FIG. 3A, a user may use a user interface 300 to deploy a rack of servers or VMs. A rack of servers or VMs may be associated with a customer number, a customer name, a data center identifier, an Agent IP address, a number of UC users, a number of UC users, an agent name, etc. as illustrated in FIG. 3A. Each VM may be represented by an IP address where the VM is located. As illustrated in FIG. 3A, the user of the application may select a template. The template may enable a user to deploy a number of types of VMs or servers, such as an AADS Terminal Server, a CM server, a SAL server, an SM server, an AAWG server, etc.

Using an user interface as illustrated in FIG. 3A, the user may be capable of selecting which servers are being used in a particular network in which a set of firewall rules is to be established. The user may select the addresses of each VM or server. The user interface 300 may be used to deploy a rack of servers or VMs or may be used to set up a firewall rule for a pre-existing set of servers and/or VMs. The user may use the user interface 300 to select whether to pre-deploy the VMs or servers. A user may desire to pre-deploy the VMs because, at this point in time, the firewalls may not be configured as the firewall rules have not yet been created.

The servers or VMs deployed for a particular customer may be represented in a database entry as illustrated by Table 1 below:

TABLE 1

| Customer | Data Center | Name | UC Users | CC Users | Template | Products | Last Deploy | Status |
| --- | --- | --- | --- | --- | --- | --- | --- | --- |
| 18 | NAR2 | C18 | 4000 | 0 | ACP_Template_0_3 | AADS, AAWG, AAWGMS, AMS, CM, PS, SAL, SBC, SBCEMS, SM | Jan. 5, 2020 10:34 AM | Done |

TABLE 1-continued

| Customer | Data Center | Name | UC Users | CC Users | Template | Products | Last Deploy | Status |
|---|---|---|---|---|---|---|---|---|
| 34 | NAR2 | wall | 4000 | 0 | ACP_Template_0_3 | AADS, AAWG, AAWGMS, AMS, CM, PS, SAL, SBC, SBCEMS, SM | Jan. 5, 2020 12:32 PM | Done |
| 60 | NAR2 | Fw60 | 4000 | 0 | ACP_Template_0_3 | AADS, AAWG, AAWGMS, AMS, CM, PS, SAL, SBC, SBCEMS, SM | Jan. 5, 2020 8:22 AM | Done |

When a database entry is selected or opened by a user, the application may display a user interface 303 as illustrated in FIG. 3B. Each server or VM in the rack may be represented by a hostname, an IP Address, a data center name, a product or server type, and other information. Each row in the user interface 303 illustrated in FIG. 3B represents a server or VM.

In some embodiments, one or more servers may be associated with a plurality of IP addresses. For example, each server may have more than one network interface and each network interface may be associated with a different IP address. Each server's network interface or different IP address may be listed separately in the database using a different Hostname. In some embodiments, multiple instances of a same type of server may exist. In such an embodiment, multiple instances of the same type of server and each server may have multiple network interfaces.

The user may be capable of interacting with a user interface, such as by right clicking, to create a set of firewall rules. A different file containing firewall rules may be created for each firewall which needs to be configured. For example, consider SIP telephony and Remote Worker. A SIP arriving at a session border controller for example and departing from the inside face of the session border controller at an interface called SBC_A1. A firewall rule allows data or a packet or flow of packets with a source of the address on SBC_A1 to an address on a session manager (SM) on the application's subnet as allowed by the SSL over TCP-5061.

In the scenario in which multiple servers or VMs of a particular type are deployed, the application may compile a plurality of rules. In general, a flow may be allowed from a first address for any servers of a first type to a second address for any servers of a second type.

In some embodiments, a firewall rule compiler may be used to autonomously create the firewall rules. As opposed to being limited by the number of servers of a particular type implemented on a network, firewall rules may be established such that flows are allowed between any servers of a particular type (e.g., SBCRW should be allowed to talk to a particular address on a session manager). This allowed communication is independent of the firewalls in place in the network.

In some embodiments, a wiring or mapping may be created showing what connections should be allowed from a particular address. The wiring or mapping may be a list of connections between a given server type and an address. Because of regularity in naming, e.g. SBCRW.inside_A1_ip_ow, the rules may be compressed down into a small set.

The controller may access a description of the firewalls in a datacenter. Networks may be separated into distinct zones and each firewall may view a network in which the firewall is implemented as a number of different subnets. For example, one zone may be the Internet and another zone may contain one or more background servers. Some servers may be configured to communicate with multiple zones. The description of the firewalls may contain a mapping of the networks into zones along with a listing of the firewalls. For example, there may be two firewalls: an internal firewall that has access to all zones and an external firewall that has connectivity to only a certain number of zones.

In some embodiments, firewalls, VMs, endpoints, and other elements of a network may be represented by a node. A node may consist of a set of named network interfaces, each of which having a set of named IP addresses. The basic structure of a node in accordance with the embodiments described herein consists of the following:

type // node type,
inst // instance number,
intf // map from address ID to interface ID
ip // map from address ID to IP address
subnet // map from interface ID to subnet ID
zone // map from subnet ID to interface ID/zone ID (firewall only)

For example, for a given node, the node type may be "SBCRW" and the node instance number may be 1. The intf, or map from address ID to interface ID, may be {"MGMT": "M1","OW_INT":"A1","RW_INT":"A1","OW_SM1": "B1","OW_SM2", "B1","RW_SM1":"B2","RW_SM2": "B2"}. The ip, or map from address ID to IP address may be {"MGMT":<ip1>, "OW_INT":<ip2>, "RW_INT":<ip3>, "OW_SM1":<ip4>, "OW_SM2":<ip5>, "RW_SM1": <ip6>, "RW_SM2":<ip7>}. The subnet, or map from interface ID to subnet ID, may be {"M1":"SBC_MGMT", "A1": "SBC_A1","B1","SBC_B1","B2":"SBC_B2"}.

It should be appreciated that by specifying a type (e.g., SBCRW) of node may select all nodes of the given type while specifying both a type and an instance number (e.g., SBCRW[1]) may select a particular node.

A firewall rule may comprise a text string such as "rules_OW_PPM from SBC_A1 source SBCRW_inside_A1_ip_ow to APPS destination SM_ip_address_2 application ssl service [TCP-443] action allow log-setting LFP-Log A11B." A remote worker ("RW") firewall may be established representing a remote worker ("rw") sending packets to a server, i.e., from the Internet to SBCRW via tcp/443 (SSL) and tcp/5061 (SIP) and described as a text string "RW_SIP: SBCRW.inside_A1_ip_rw→SM.ip_address_2 sips tcp/5061". The flow represented by the text string "RW_SIP: SBCRW.inside_A1_ip_rw→SM.ip_address_2 sips tcp/5061" red is coming in via an IP address globally rooted via the Internet and the IP address is mapped to an internal address. External firewall rules may comprise a text string such as "set pre-rulebase security rules RW_SM1_EXTIN from INTERNET source any to SBC_B2 destination SBCRW_registrar_B2_publicip_sm1 application any service [TCP-443]". By analyzing information associated with a flow such as the flow's source and destination, the controller may be configured to determine which firewall should be programmed and what rule should be created.

In some embodiments, each flow may cross one firewall or multiple firewalls. A source of a flow may be on one firewall and the destination of the flow may be on a second firewall. As can be appreciated, a single packet may be routed through a number of firewalls. Furthermore, one set of flows may be compiled into different rules depending on the type of firewall (i.e., zonal or distributed) being used. Also, different firewall rules may be created for different vendors. For example, an internal firewall may be of a type Juniper while an external firewall may be of a type Palo Alto. Rules may be generated from the same flows for different firewall vendors. The mapping of networks to zones may be different as well. Many firewalls take the interface on which a connection arrives into account when matching rules. Interfaces belonging to the same zone may be treated as equivalent. As such, the difference in mapping of networks to zones may also affect the creation of rules. For example, if a flow begins and ends in a same zone, no firewall rule is needed.

The ability to use a common set of flows to generate firewall rules for multiple situations as described herein is beneficial. In general, rules written by people have much larger holes than are necessary. Using a system or method as described herein, much tighter holes in firewalls are created, making a much more robust system of firewalls. Manually written firewall rules, on the other hand, are often inefficient. For example, users may write "any" in a service column instead of explicitly listing a service such as TCP-5061. This is an example of users writing rules with much larger holes than are necessary. Also, manually written rules may group multiple source and destination zones together so that if any source or destination zone are connected. Users may write shortcut rules in this way to avoid writing an excessive number of rules. If the rules are instead created based on documented flows, as described herein, the compiler as described herein creates more exact rules in a more efficient manner.

As should be appreciated, a description of flows that is somewhat abstracted may be used to compile a set of firewall rules for a network, independent of server topology and firewalls. The firewall rules may be compiled in such a way as to be completely customized to an actual situation.

Using the systems and methods described herein, a non-controversial, factual, abstract representation of flows may be used to create a set of firewall rules which can be downloaded and imported to one or more firewalls to configure the firewalls. In this way, whole systems or racks may be deployed at once while firewall management systems are more for managing up and running systems on a day to day basis. The systems and methods described herein enable an automated system that deploys servers and sets up firewall rules without requiring interaction from a user. The flows are moving through firewalls. Each firewall decides whether to let the flow through. That decision is made based on firewall rules.

Each flow or packet is associated with a source and a destination. The source may be associated with a type (e.g. a server type) and an address from which the flow is originating. The destination may also be associated with a type and an address. The flow may be associated with a protocol (e.g. TCP) and an address (which may be the destination address). Using the source and destination information, and looking at a wiring diagram, it can be determined that a given packet is on a given network or subnetwork. Also, the network the data packet or flow is coming from can be determined based on the source address of the flow and the network the data packet is going to can be determined based on the destination address of the flow. Using this information, the network zones can be mapped. If a packet begins and ends in a single zone, no firewall rule is needed. If a packet begins and ends in different zones, a firewall rule can be created based on the path required for the packet to flow and what firewalls need to be traversed by the packet to be delivered from the source zone to the destination zone. Based on this determination, a new firewall rule may be created. Typically, a firewall rule requires computing the source and destination addresses for each flow. Here, we know that we're dealing with a particular address.

Figure 4:
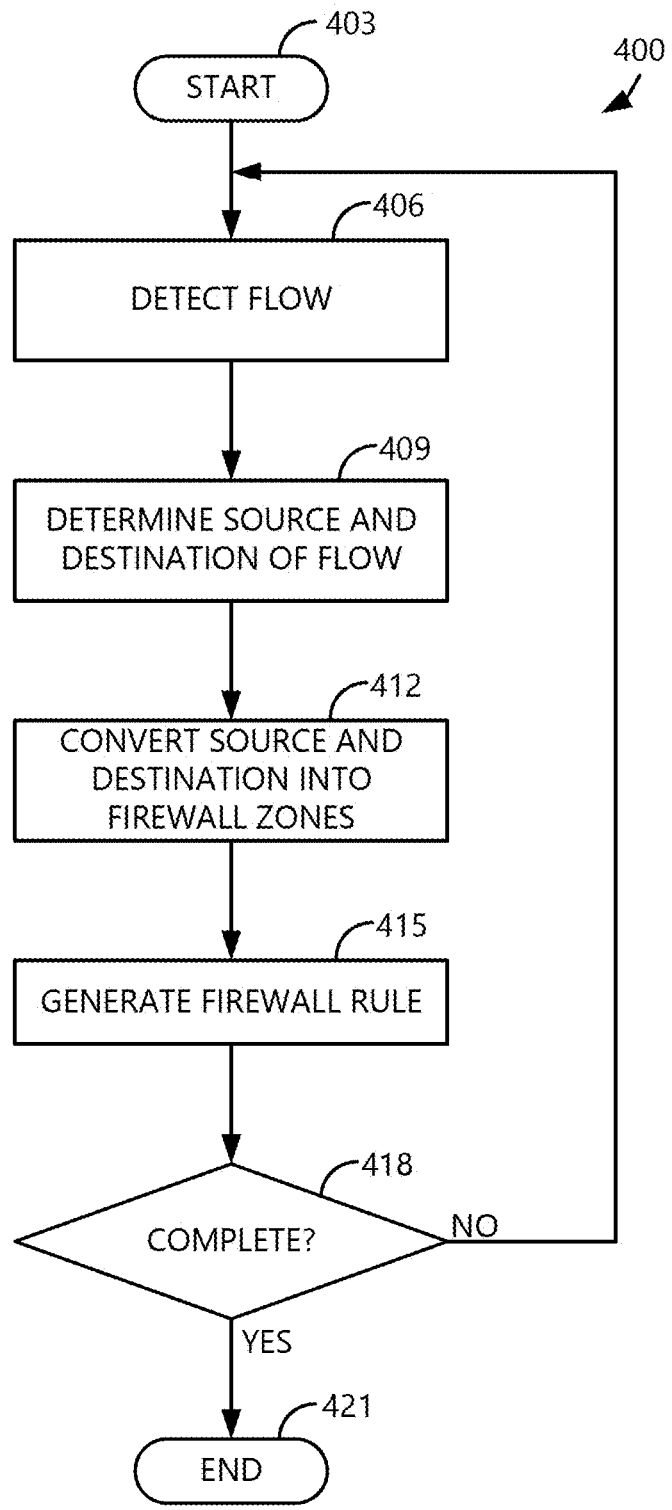

FIG. 4 is a high-level flow diagram illustrating a method 400 for autonomously creating and updating firewalls for a deployed network of virtual machines. In some embodiments, the method 400 may begin at step 403 which may be prior to deployment of the VMs or after deployment of the VMs. The method 400 may be implemented, for example, by the system 100 of FIG. 1 and the computer system 200 of FIG. 2 performing as controller 140. The steps of the method 400 and other methods described herein should be considered as representative groupings of functionality. It should be appreciated that in some embodiments a greater or lesser number of steps may be used to perform the same or similar methods and the steps may be performed in a variety of orders. Any of the steps, functions, and operations discussed herein can be performed continuously and automatically.

As described herein, it has been observed that data flows between VMs can be described independently from network topology and, when combined with a simplified network description representing the connectivity of network interfaces on VMs and firewalls, a firewall rules compiler may have access to sufficient information such that the compiler may be capable of generating firewall rules for a firewall regardless of firewall type and vendor.

The method 400 for establishing a set of firewall rules may comprise detecting, by a processor of a computer system, a flow of packets in a network in step 406. The flow of packets may be detected, for example, flowing from a first VM to a second VM or between firewalls.

A data flow description may be represented by a graph in which nodes representing VMs and endpoints are joined by edges representing data flows. It is a synthesis of product port matrices and solution design. Flows may be of the form "src node.IP→dst node.IP protocol port/port range." For example,

SBCRW.RW_INT→SM.ASSET SIPS TCP/5061 allows SIP over TLS connections from the RW_INT IP on any SBCRW to TCP port 5061 on the ASSET IP on any session manager. Replacing the → by <→ allows the SM to do likewise. Although endpoints are outside of the datacenter, they may need to be collectively represented as a node in order to trigger configuration in edge firewalls.

Similarly, a network description may be represented by a graph in which nodes representing VMs, endpoints, and firewalls are joined by edges representing subnets. The wiring of network interfaces to subnets may be specified and used to populate a nodal subnet map as well as a subnet to firewall map ("FW"). For example, SBC_A1: SBCRW.A1, FW[1].A1 and

APPS: SM.ASSET, FW[1].APPS wires the A1 interfaces on all SBCRWs to the SBC_A1 subnet and the ASSET interfaces on all SMs to the APPS subnet. The firewall FW[1] is connected to both subnets.

Distributed firewalls such as AWS™ security groups are present at each VM. Such security groups can be handled by the rule compiler without representation in the network description.

In response to detecting the flow, the method 400 may comprise determining, by the processor, a source of the flow and a destination of the flow in step 409.

After determining the source and destination of the flow, the method 400 may comprise converting the source of the flow into a first firewall zone and the destination of the flow into a second firewall zone in step 412. In some embodiments, converting the source of the flow into a firewall zone comprises executing a series of lookups.

When generating firewall rules from flows, source and destination VMs and endpoints need to be converted into firewall zones. For the source zone, this is accomplished through a series of lookups:

source subnet: ss=subnet[intf[src IP]] wrt source node;
firewall: fs=fw[s] wrt subnet to firewall map; and
source zone: zs=zone[s] wrt firewall node.

For example, SBCRW.RW_INT would match the SBCRW[1] node, so intf["RW_INT"]="A1" and ss=subnet ["A1"]="SBC_A1". The subnet to firewall map yields fs=FW[1]. Assuming that every interface on FW[1] is assigned to a namesake zone, then zs="SBC_A1". A similar series of lookups yields sd, fd, and zd for the destination zone.

In step 415, a firewall rule may be generated by the processor based on the first firewall zone and the second firewall zone. In some embodiments, after generating the firewall rule, the method 400 may comprise deploying a plurality of virtual machines and firewalls. For example, a first virtual machine within the first firewall zone and a second virtual machine within the second firewall zone may be generated. The firewalls may also be generated and may be pre-configured with the firewall rule.

In some embodiments, source and destination IP sets in a flow may be populated using a nodal ip map. Instructions to the firewall may be emitted to represent the source and destination IP sets as named objects, after which they can be referenced in rules. The mapping of the protocol in the flow to an application recognizable by the firewall may be vendor-specific.

Continuing with the preceding examples, the flow
SBCRW.RW_INT<→SM.ASSET SIPS TCP/5061
might turn into the following on a Palo Alto firewall:
address object SBCRW_1_RW_INT: <ip3>;
address object SM_1_ASSET: <ip8>;
address object SM_2_ASSET: <ip9>;
address group SM_ASSET: SM_1_ASSET, SM_2_ASSET;
service object TCP_5061: TCP_5061; and
rule: SBC_A1,SBCRW_1_RW_INT→APPS,SM_ASSET ssl TCP_5061
allow,
where it may additionally be assumed that there are two SMs with asset IPs <ip8> and <ip9>.

At step 418, the processor may determine whether the method 400 should end or continue. If the method 400 is complete, the method 400 may end at step 421. If the method 400 is not complete, the method 400 may return to step 406, detect a second flow, and repeat the method to generate a second firewall rule.

In some embodiments, a method 500 for generating outbound rules for distributed firewalls may begin, as illustrated in FIG. 5, with a controller 140 detecting a flow and determining a source node associated with the flow is a virtual machine in step 503. Based on the determination that the source node is a virtual machine, the controller 140 may determine a type of the virtual machine in step 506. Finally, in step 509, an outbound rule for a security group associated with the type of the virtual machine may be generated.

Similarly, in some embodiments, a method 600 for generating inbound rules for distributed firewalls may begin, as illustrated in FIG. 6, with a controller 140 detecting a flow and determining a destination node associated with the flow is a virtual machine at 603. Based on the determination that the destination node is a virtual machine, the controller 140 may determine a type of the virtual machine in step 606. Finally, in step 609, an inbound rule for a security group associated with the type of the virtual machine may be generated.

Using AWS™ security groups as an example, each type of VM has its own security group. For each flow, if the source node is a VM, an outbound rule is added to the VM type's security group. Similarly, if the destination node is a VM, an inbound rule is added. Unlike in the non-distributed case, having the same source and destination subnets does not obviate the need for a rule.

Returning to the example, the flow
SBCRW.RW_INT<→SM.ASSET SIPS TCP/5061
contributes the following rules to the SBCRW and SM security groups:
SBCRW: out SM TCP 5061; and
SM: in SBCRW TCP 5061.

In some embodiments, a method 700 for generating firewall rules for non-distributed firewalls may be performed. The method 700 may comprise, in step 703, determining a source of a flow is associated with a first firewall and a destination of the flow is associated with a second firewall different from the first firewall.

In step 706, the method 700 may comprise determining a shortest path from the first firewall to the second firewall based on the determination that the source of the flow is associated with the first firewall and the destination of the flow is associated with the second firewall different from the first firewall. If the source and destination firewalls are not the same, a path can be found by applying Dijkstra's algorithm for shortest path to the subset of the network graph containing only firewall nodes. Each link on the path yields a bridging flow.

Based on the shortest path from the first firewall to the second firewall, a set of firewall rules may be generated in step 709. The set of firewall rules may be a set of inbound firewall rules or outbound firewall rules.

The systems and methods described herein enable rules for internal firewalls, firewalls for common areas (e.g., within a datacenter), and external firewalls to be supported together. In this way, multiple firewall vendors (e.g., Palo Alto, Juniper, Fortinet, etc.) may be supported as may firewalls for multiple data centers or environments. The systems and methods described herein enable a small number of abstract flows to be written to capture all of the interactions between a set of products, servers in common areas, and external connectivity, which makes reviewing and changing flows and the firewall rules generated from the flows easier.

Figure 8:
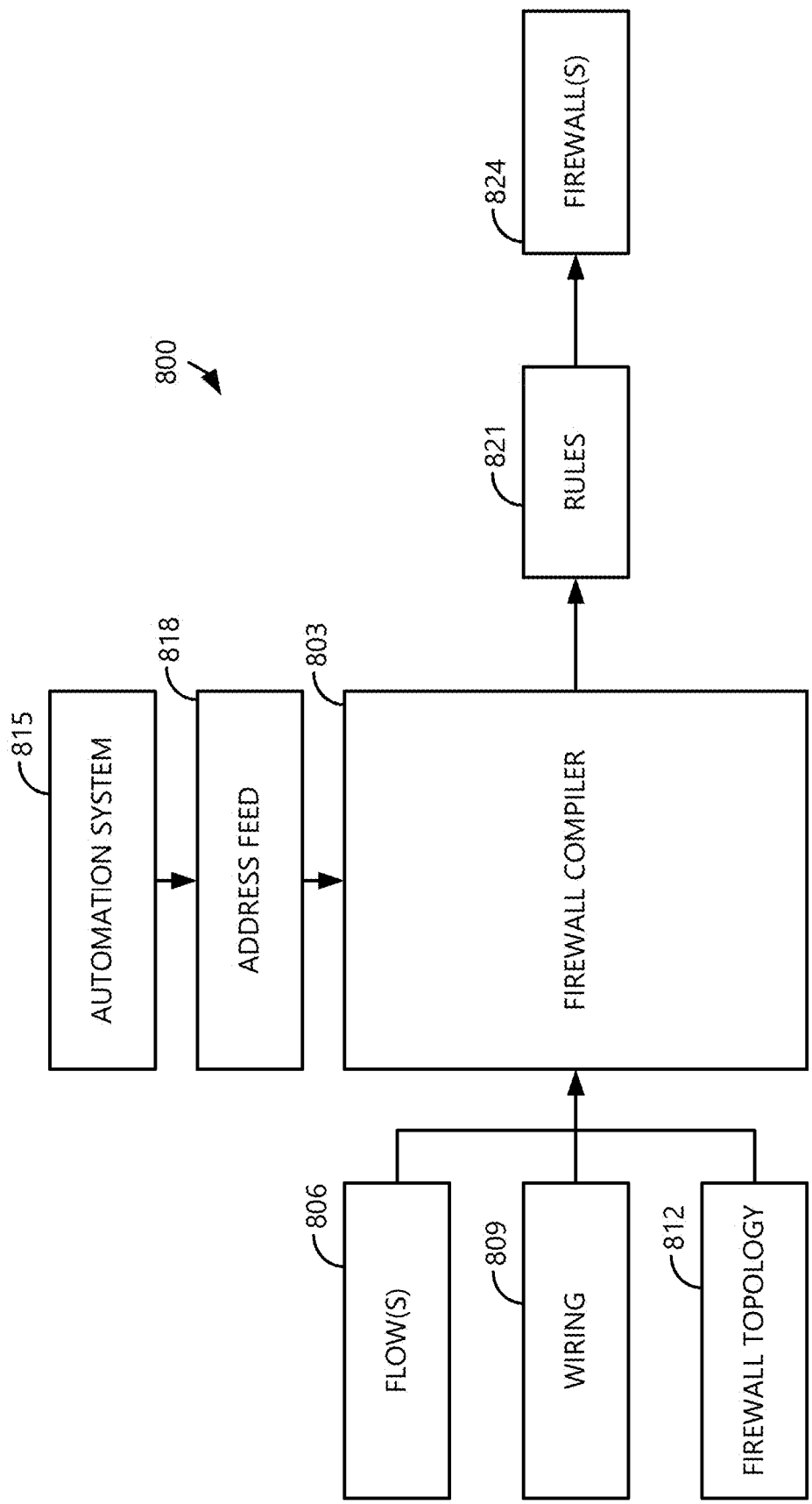
FIG. 8 is an illustration of a system comprising a firewall compiler in accordance with one or more embodiments of the present disclosure.

As illustrated in FIG. 8, a system 800 for configuring one or more firewalls 824 may comprise a firewall compiler 803 receiving information such as one or more flows 806, a wiring 809, a firewall topology 812, and an address feed 818. The address feed 818 may be received by the firewall compiler 803 from an automation system 815. The firewall compiler 803 may be configured to output one or more rules 821 which may be used to configure the one or more firewalls 824.

When a user such as a solution architect designs a network, the user may select a number of VMs and/or other computing entities, of various types to provide a desired functionality. The user may then write flows which capture the way that the VMs and/or other computing entities, should be allowed to communicate with each other. The user may also create a wiring which describes how the VMs and/or other computing entities are interconnected.

A single design for a network may be hosted by any number of different data centers. Each data center may have a different set of firewalls of different types. Because each data center, or other computing environment, in which a design is deployed may have any number of different firewalls in use, each data center must have its own custom set of firewall rules. As a result, after creating a design, a user such as a solution architect, a data center designer, or a system administrator, using conventional methods of configuring firewalls, are required to manually write rules to enable the entities, such as VMs and/or other systems, within the design to properly communicate. Using a system or method as described herein, however, rules for configuring firewall rules may be created automatically and in real-time. Such systems and methods enable large numbers of systems, such as data centers, to be deployed without delay in such a way that was not possible prior to the development of the systems and methods described herein.

Figure 9:
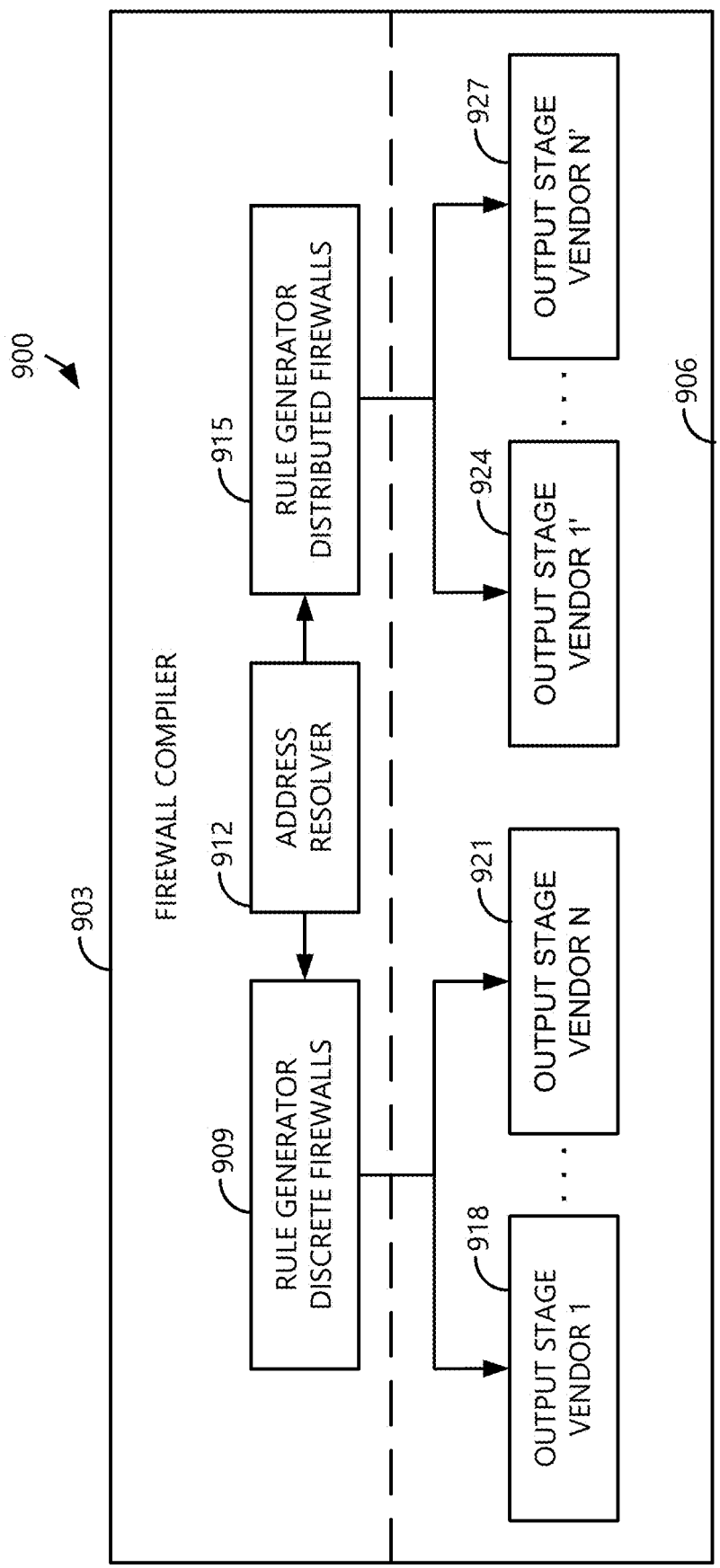
FIG. 9 is a block diagram of a firewall compiler in accordance with one or more embodiments of the present disclosure.

As illustrated in FIG. 9, a firewall compiler 900 may comprise two stages 903, 906. A first stage 903 may be used to transform one or more flows into rules. Within the first stage 903, a different rule generator 909, 915 may be used dependent upon the class of firewall which is to be configured. For example, a rule generator for discrete firewalls 909 may output rules for discrete firewalls and a rule generator for distributed firewalls 915 may output rules for distributed firewalls.

An address resolver 912 may be used by both the rule generator for discrete firewalls 909 and the rule generator for distributed firewalls 915. The address resolver 912 may be configured to interface with an automation system.

The firewall compiler 900 may also comprise a second stage 906 which may be configured to render rules generated in the first stage 903 into a syntax required by a specific vendor based on the vendor of each firewalls affected by the input flows. For example, the rule generator for discrete firewalls 909 may generate a set of rules for each discrete firewall within a system. The rules created by the rule generator for discrete firewalls 909 may be processed by separate output stage vendors 918, 921 for firewalls of different vendor. While two output stages, output stage vendor 1 918 and output stage vendor N 921 are illustrated, it should be appreciated any number of output stages may be used in a single firewall compiler.

Similarly, the rule generator for distributed firewalls 915 may generate a set of rules for each distributed firewall within a system. The rules created by the rule generator for distributed firewalls 915 may be processed by separate output stage vendors 918, 921 for firewalls of different vendor. While two output stages, output stage vendor 1' 924 and output stage vendor N' 927 are illustrated, it should be appreciated any number of output stages may be used in a single firewall compiler.

Figure 10:
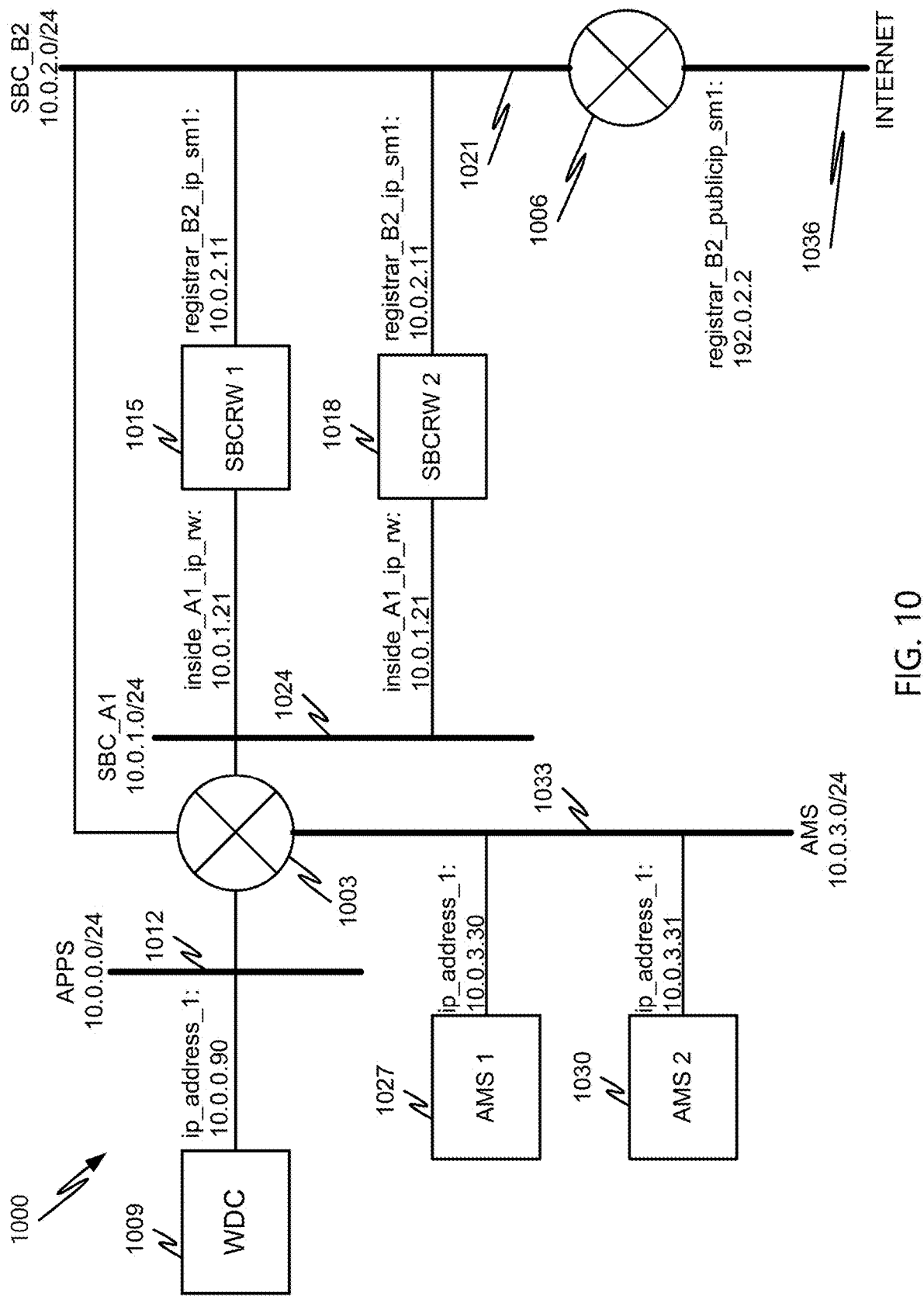
FIG. 10 is a block diagram of a computing environment in accordance with one or more embodiments of the present disclosure.

As an example, as illustrated in FIG. 10, of a potential embodiment of the systems and methods described herein, consider a case of three flows of data in a computing environment 1000 in which two firewalls 1003, 1006 are enabled. In the exemplary computing environment 1000, a windows server (WDC) 1009 may be connected to an APPS subnet 1012 at, for example, an IP address of 10.0.0.90, i.e., ip_address_1=10.0.0.90. As discussed below, a given type of VM has a certain set of named addresses, similar to the pinouts of integrated circuits. In this example, both WDC and AMS have ip_address_1.

Using the systems and methods described herein, a set of abstract flows may be compiled into one or more sets of firewall rules which may be used to configure one or more firewalls in computing environments in which any number of computing elements are deployed.

For example, the computing environment 1000 may comprise a session border controller (SBCRW). The SBCRW may in some embodiments comprise a pair of VMs (SBCRW VMs) 1015, 1018 for redundancy. Each of the SBCRW VMs 1015, 1018 may use the same IP addresses. The SBCRW 1015, 1018 may have an outward-facing side connected to an SBC_B2 subnet 1021 at an IP address of 10.0.2.11, i.e., registrar_B2_ip_sm1=10.0.2.11 and an inward-facing side connected to an SBC_A1 subnet 1024 at an IP address of inside_A1_ip_rw=10.0.1.21. The outward-facing side of the SBCRW 1015, 1018 may be mapped to an IP address registrar_B2_publicip_sm1=192.0.2.2 using network address translation (NAT).

The computing environment may also comprise one or more media servers. For example, two media servers (AMSs) 1027, 1030 may be connected to an AMS subnet 1033 at an ip_address_1. The first AMS, AMS #1, 1027 may have an IP address of ip_address_1=10.0.3.30 and the second AMS, AMS #2, 1030 may have an IP address of ip_address_1=10.0.3.31.

Traffic in the computing environment may comprise audio/video media traffic (RTP) entering the computing system from the Internet 1036 via the SBCRW 1015, 1018 through SBC_B2 1021 between UDP ports 20000-59999. The RTP may be relayed out SBC_A1 1024 to AMS 1027, 1030 via UDP ports 6000-32598. The traffic may also comprise outgoing HTTPS from WDC 1009 to the Internet 1036 using the standard TCP port 443.

The traffic may be described to a firewall compiler in the form of flows as follows:
RTP_IN_1:
   INTERNET→SBCRW.registrar_B2_publicip_sm1 rtp udp/20000-59999
  nat: dst registrar_B2_ip_sm1
RTP_IN_2:
   SBCRW.inside_A1_ip_rw→AMS.ip_address_1 rtp udp/6000-32598
  WEB: WDC.ip_address_1→INTERNET https tcp/443

As should be appreciated, a flow may indicate a particular type of source entity, such as a session border controller, should be allowed to communicate with a particular type of destination entity, such as a media server, over certain protocols and ports. In some embodiments, a flow may be written by a user such as a solution architect and may be received by a firewall compiler 900 as described herein. As described below, in a method 1100, a firewall compiler 900 may be a process executed by a computer system. In a step 1106, the computer system may receive one or more flows by, for example, accessing the flows via a network connection, accessing the flows in storage, or receiving the flows from a user.

The above example flows are written in a form of
<name>: <src>→<dst><app><svc>
nat: dst <addr>

In general, a flow may be of the form
<name>: <src>(,<src>)*→|←|<=><dst>(,<dst>)* <app>(,<app>)* <svc>(,<src>)*
[nat: src dst <addr>]
[snat|dnat: <addr>]

A flow consists of a specification of allowed traffic and optionally, a specification of network address translation. <src>, <dst>, <app>, and <svc> are comma-separated lists.

The destination expression, SBCRW.registrar_B2_publicip_sm1, is of the form
<type>.<addr>

In general, source and destination expressions may be of the form
[<dc>/]<type>[. <addr>]
i.e., <type> is optionally preceded by <dc> and optionally followed by <addr>.

The service, udp/2000-59999, is of the form
<proto>/<port>-<port>

In general, a service takes one of the following forms:
any |<id>|tcp|udp/<port>[-<port>]

The address resolver 912 of the firewall compiler 912 as discussed above uses wiring information to process source and destination expressions. Wiring information describes how different types of entities, such as VMs, servers, etc., are connected within a network, and consists of a list of wiring rules. Wiring information may be provided to a firewall compiler 900 by a user such as a solution architect. For example, in the exemplary embodiment described above, the following wiring rules may be used to describe how the VMs are connected to the subnets:

type: INTERNET
addr: ip_address_1
type: [AMS]
net: AMS
query: vm
addr: A1_
net: SBC_A1
query: vm
addr: B2_
net: SBC_B2
query: vm
net: APPS
query: vm A wiring rule consists of conditions that an address expression's components must satisfy before the wiring rule applies. When a rule matches, it says something about the nature of the address expression:
net: what subnet it is on
query: how to resolve it to actual IP addresses Address expressions may be checked against wiring rules in order. For example, AMS.ip_address_1 is on the AMS subnet by rule 2, since type=AMS and addr=ip_address_1. SBCRW.inside_A1_ip_rw is on the SBC_A1 subnet by rule 3 since addr=inside_A1_ip_rw contains A1_. Similarly, SBCRW.registrar_B2_publicip_sm1 is on the SBC_B2 subnet by rule 4. INTERNET refers to the namesake network by rule 1. WDC.ip_address_1 is on the APPS subnet according to rule 5 since no other rule matches.

A wiring rule contains zero or more of the following conditions:

type match: the <type> part of the address expression is in the list of types in the rule (enclosed by [ . . . ])

address match: the address string in the rule appears somewhere in the <addr>part of the address expression, e.g., "B2_" is a substring of "registrar_B2_publicip_sm1."

data center match: the <dc> part of the address expression is in the list of data centers in the rule By assigning address names in a regular manner, a handful of wiring rules can capture the same information as complicated wiring diagrams.

Query methods are ways to ask for addresses from an address feed provider. The following exemplary query methods cover most use cases:

vm: look up an address associated with a VM
app: look up an address associated with a cluster of VMs
tools: look up an address associated with an entity present in the environment
subnet: look up the address and netmask of a network
remote: perform look up at the data center indicated by the <dc> part of the address expression. Once at that data center, strip off the <dc> part from the address expression and perform a wiring rule match to determine the query method.
any: may refer to any address and needs no resolution.

An automation system may be used to create and configure a set of constituent VMs based on a description of a design. A typical design consists of tens of VMs, with each VM requiring tens to hundreds of configuration steps, many of which have prerequisites requiring the configuration steps to be performed in a proper order. Automation provides a capability to deploy a set of VMs in mere hours as compared to months using conventional methods of manually creating and configuring VMs.

As described herein, an automation system configured to fulfill the vm, app, tools, and subnet queries may be used to provide an address feed to the firewall compiler 900. A firewall compiler 900 integrated with an automation system may provide a number of practical benefits. For example, the firewall compiler 900 may be capable of generating firewall rules that conform to a particular set of VMs deployed exactly and generating updated firewall rules as additional VMs are added. Other conceivable and useful integrations may also be possible. For example, a rule generator for discrete firewalls 909 may output rules for discrete firewalls and a rule generator for distributed firewalls 915 may output rules for distributed firewalls.

An address feed may describe actual instances of entities within a computing environment and their associated addresses. Query methods may be used to select data from the address feed. For example,

```
WDC:
    ip_address_1: 10.0.0.90
SBCRW1:
    inside_A1_ip_rw: 10.0.1.21
    registrar_B2_ip_sm1: 10.0.2.11
    registrar_B2_publicip_sm1: 192.0.2.2
SBCRW2:
    inside_A1_ip_rw: 10.0.1.21
    registrar_B2_ip_sm1: 10.0.2.11
    registrar_B2_publicip_sm1: 192.0.2.2
AMS1:
    ip_address_1: 10.0.3.30
AMS2:
    ip_address_1: 10.0.3.31
```

Such information may be considered a mapping of entity instances to actual IP addresses. An address resolver 912 of a firewall compiler 900 may receive such information in the form of an address feed from an automation system such as illustrated in FIG. 8.

The following is an example of a firewall topology:

```
FW:
    type: paloalto
    zones:
        APPS: INSIDE
        AMS: MEDIA
        SBC_A1: MEDIA
        SBC_B2: OUTSIDE
        INTERNET: INTERNET
    apps: paloalto
    dev_grp: FW
    dev: FW
```

In general, it should be appreciated that a firewall topology may comprise a list of firewalls within a network. For each firewall, the firewall topology may indicate a firewall type for the firewall and a list of networks connected to the firewall. The topology may also comprise information such as zone assignments for each network and a routing table. A topology may be data stored within a data center and may be accessible by a firewall compiler. A firewall topology may describe how a design's networks are connected to a data center's firewalls. The user or users who design a data center may generate a topology with a user such as a solution architect.

The above-described example firewall arrangement, or topology, should be appreciated as comprising a single firewall, FW. The APPS subnet is assigned to the INSIDE zone, AMS and SBC_A1 are together in the MEDIA zone, etc. Based on the wiring, topology, address feed, and other elements, the computer system executing the firewall compiler 900 may detect the elements within a computing system environment. As discussed below, it should be appreciated that the elements of the computing environment may be detected prior to the computing environment being deployed, that is, prior to the VMs or other computing elements being installed. In this way, the computer system, in the method 1100 as described below, may perform a step 1109 of detecting elements of the environment. Detecting the elements of the computing environment may further comprise determining, for each firewall within the computing environment, a firewall type, vendor name, etc. Furthermore, detecting the elements of the computing environment may comprise detecting only the elements of the computing environment which are affected by the one or more flows received.

Given the above firewall topology, the firewall compiler 900 translates the three flows above into the following set of firewall rules for firewall FW:

set device-group FW address NAAVA9_SBCRW_192.0.2.2 ip-netmask 192.0.2.2/32
set device-group FW address NAAVA9_WDC_10.0.0.90 ip-netmask 10.0.0.90/32
set device-group FW service UDP-20000-59999 protocol udp port 20000-59999
set device-group FW service TCP-443 protocol tcp port 443
edit device-group FW pre-rulebase security rules NAAVA9_RTP_IN_1
    set target devices FW
    set from INTERNET
    set source any
    set to OUTSIDE
    set destination NAAVA9_SBCRW_192.0.2.2
    set application [rtp rtp-base rtp-audio rtp-video rtcp]
    set service UDP-20000-59999
    set action allow
    top
edit device-group FW pre-rulebase nat rules NAAVA9_RTP_IN_1_1
    set target devices FW
    set from OUTSIDE
    set source 10.0.2.11
    set to INTERNET
    set destination any
    set service any
    set source-translation static-ip bi-directional yes
    set source-translation static-ip translated-address 192.0.2.2
    top
edit device-group FW pre-rulebase security rules NAAVA9_WEB
    set target devices FW
    set from INSIDE
    set source NAAVA9_WDC_10.0.0.90
    set to INTERNET
    set destination any
    set application ssl
    set service TCP-443
    set action allow
    top As discussed above and as illustrated in FIG. 9, the firewall compiler 903 may used a different rule generator 909, 915 for generating rules for distributed firewalls than for generating rules for discrete firewalls. The computer system executing the firewall compiler may generate the firewall rules as described herein in a step 1112 of a method 1100 as described below. It should be appreciated in the above example that the flow RTP_IN_1 was used to produce two firewall rules: a security rule and a NAT rule. Also, it should be appreciated that no rule was generated for flow RTP_IN_2 because the source and destination of the flow RTP_IN_2 are both in the same zone, i.e., the MEDIA zone.

As can be seen from the presence of IP addresses, the firewall rules were generated for a specific population of VMs according to the address feed. A different population may yield a different set of rules.

The firewall rules were generated for a Palo Alto firewall based on the firewall topology. The generated rules would be different for example if another vendor, e.g., Juniper, were specified based on the firewall topology. For example, as discussed above, a firewall compiler 900 may comprise a first stage 903 which may include a different rule generator 909, 915 for discrete firewalls and distributed firewalls and a second stage 906 configured to render rules generated in the first stage 903 into a syntax required by a specific vendor based on the vendor of each firewalls affected by the input flows. For example, the rules created by the rule generator for discrete firewalls 909 may be processed by separate output stage vendors 918, 921 for firewalls of different vendors.

The following is an example of a different firewall topology:

```
FW1:
    type: paloalto
    zones:
        APPS: INSIDE
        AMS: INSIDE
```

-continued

```
        SBC_A1: MEDIA
        SBC_B2: OUTSIDE
      routes:
        FW2: [SBC_B2,FW2]
      apps: paloalto
      dev_grp: FW1
      dev: FW1
    FW2:
      type: paloalto
      zones:
        SBC_B2: OUTSIDE
        INTERNET: INTERNET
      Routes
        FW1: [SBC_B2,FW1]
      apps: paloalto
      dev_grp: FW2
      dev: FW2
```

The above-described example firewall arrangement should be appreciated as comprising two firewalls, FW1 and FW2. On FW1, note that AMS has been moved into the INSIDE zone. The Internet connection is on FW2. FW1 and FW2 are connected over SBC_B2: the routes say that on FW1, take SBC_B2 to get to FW2, and on FW1, take SBC_B2 to get to FW1.

Given the above firewall topology, the firewall compiler translates the three flows above into the following set of firewall rules for firewall FW1:

set device-group FW1 address NAAVA9_SBCRW_10.0.1.21 ip-netmask 10.0.1.21/32
    set device-group FW1 address NAAVA9_AMS_10.0.3.30 ip-netmask 10.0.3.30/32
    set device-group FW1 address NAAVA9_AMS_10.0.3.31 ip-netmask 10.0.3.S1/32
    set device-group FW1 address NAAVA9_WDC_10.0.0.90 ip-netmask 10.0.0.90/32
    set device-group FW1 address-group NAAVA9_AMS_ip_address_1 static [NAAVA9_AMS_10.0.3.30 NAAVA9_AMS_10.0.3.31]
    set device-group FW1 service UDP-6000-32598 protocol udp port 6000-32598
    set device-group FW1 service TCP-443 protocol tcp port 443
    edit device-group FW1 pre-rulebase security rules NAAVA9_RTP_IN_2
    set target devices FW1
    set from MEDIA
    set source NAAVA9_SBCRW_10.0.1.21
    set to INSIDE
    set destination NAAVA9_AMS_ip_address_1
    set application [rtp rtp-base rtp-audio rtp-video rtcp]
    set service UDP-6000-32598
    set action allow
    top
    edit device-group FW1 pre-rulebase security rules NAAVA9_WEB
    set target devices FW1
    set from INSIDE
    set source NAAVA9_WDC_10.0.0.90
    set to OUTSIDE
    set destination any
    set application ssl
    set service TCP-443
    set action allow
    top Given the above firewall topology, the firewall compiler translates the three flows above into the following set of firewall rules for firewall FW2:

set device-group FW2 address NAAVA9_SBCRW_192.0.2.2 ip-netmask 192.0.2.2/32
    set device-group FW2 address NAAVA9_WDC_10.0.0.90 ip-netmask 10.0.0.90/32
    set device-group FW2 service UDP-20000-59999 protocol udp port 20000-59999
    set device-group FW2 service TCP-443 protocol tcp port 443
    edit device-group FW2 pre-rulebase security rules NAAVA9_RTP_IN_1
    set target devices FW2
    set from INTERNET
    set source any
    set to OUTSIDE
    set destination NAAVA9_SBCRW_192.0.2.2
    set application [rtp rtp-base rtp-audio rtp-video rtcp]
    set service UDP-20000-59999
    set action allow
    top
    edit device-group FW2 pre-rulebase nat rules NAAVA9_RTP_IN_1_1
    set target devices FW2
    set from OUTSIDE
    set source 10.0.2.11
    set to INTERNET
    set destination any
    set service any
    set source-translation static-ip bi-directional yes
    set source-translation static-ip translated-address 192.0.2.2
    top
    edit device-group FW2 pre-rulebase security rules NAAVA9_WEB
    set target devices FW2
    set from OUTSIDE
    set source NAAVA9_WDC_10.0.0.90
    set to INTERNET
    set destination any
    set application ssl
    set service TCP-443
    set action allow
    top It should be appreciated that in the above example firewall rules, flow RTP_IN_1 produced a rule on FW2, because the Internet is on FW2. Flow RTP_IN_2 produced a rule, unlike the previous example, on FW1, because SBC_A1 and AMS are in different zones. Flow WEB produced rules on both FW1 and FW2 using the route APPS→SBC_B2→INTERNET.

As should be appreciated, a single set of flows may compile to any number of different sets of rules depending on how the networks within each particular system or data center are connected to firewalls.

In general, if net(X) is the network that the address resolver 912 of the firewall compiler 900 assigns to address expression X, then given a flow s1,s2, . . . →d1,d2, sets of source and destination networks may be computed:

$Ns=\{net(s1), net(s2), \ldots\}$
$Nd=\{net(d1), net(d2), \ldots\}$

Based on the firewall topology, sets of firewalls with connectivity to the respective sets of networks may then be computed:

$Fs=\{fw|fw$ has connectivity to all networks in $Ns\}$
$Fd=\{fw|fw$ has connectivity to all networks in $Nd\}$ If the intersection of Fs and Fd is empty for a given flow, the firewall compiler may determine the flow begins in one firewall and ends in another, and a route will have to be found between the two. Note that the route consists of a sequence of firewalls, not routers. If the intersection of Fs and Fd is non-empty, a single firewall should be capable of handling the flow.

Specifying a small routing table for each firewall in the topology may suffice. An entry in a routing table may identify a path for a given flow. For example, an entry may identify the ultimate destination of a flow is a firewall X, the next hop is a firewall Y, and data must be routed via a network Z. In some embodiments, Dijkstra's algorithm may be utilized on the topology to determine the route in addition to or instead of using a routing table.

If a flow begins and ends in the same zone on a single firewall, the firewall compiler may be configured to optimize the firewall by not generating a security rule based on the flow.

For a unidirectional flow (→), the firewall compiler may generate a unidirectional security rule at each firewall along the route of the flow.

For a bidirectional flow (<→), the firewall compiler may generate a unidirectional security rule for each direction at each firewall along the route of the flow.

For a meshed flow (<=>), the firewall compiler may optimize the firewall by generating a single bidirectional security rule between all sources and destinations.

If source NAT (snat) is requested, the firewall compiler may generate a single NAT rule that maps all IP addresses to which the source resolves to the IP address to which the destination resolves.

If destination or bi-directional NAT (dnat/nat) is requested, the firewall compiler may generate multiple NAT rules, as source and destination jointly resolve to pairs of IP addresses.

Figure 11:
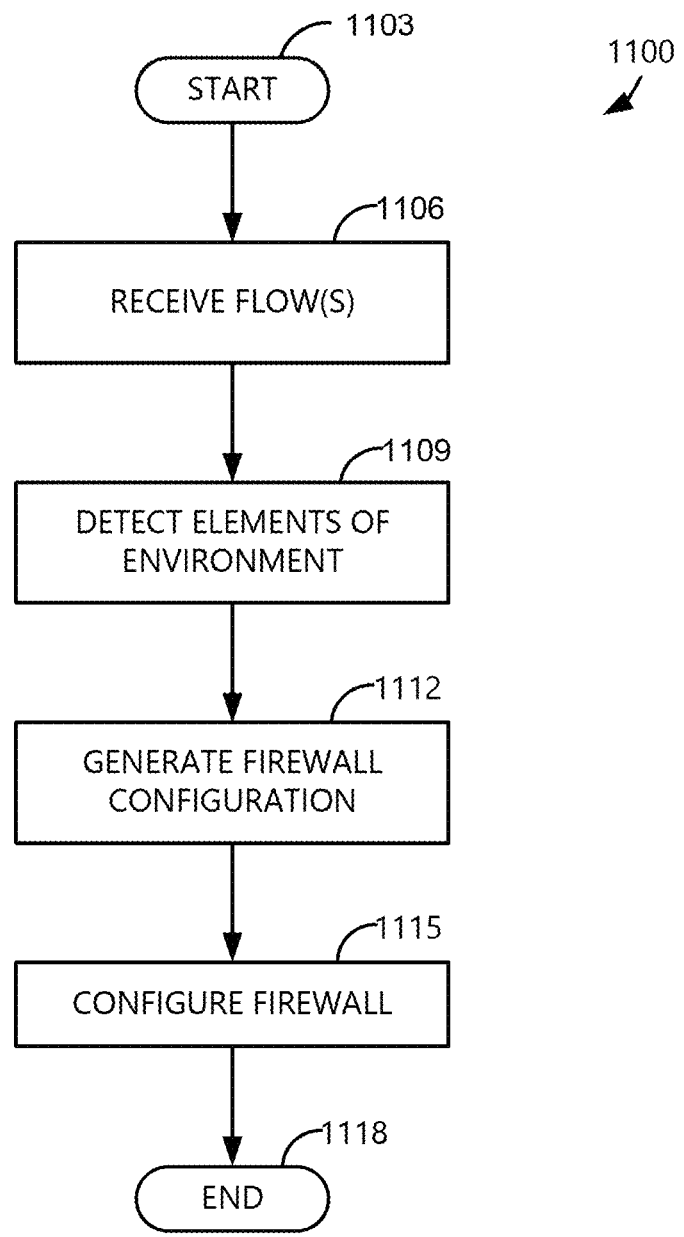
FIG. 11 is a flowchart of a method in accordance with one or more embodiments of the present disclosure.

The above-described steps may be performed by a first stage of a firewall compiler 900 to produce rules in an abstract form. Such rules may be fed to an output stage 918, 921, 924, 927 of the firewall compiler 900 specific to a vendor of a firewall affected by the rules. The output stage specific to the vendor of the firewall produces rules that can be loaded into the firewall. For example, in a method 1100 as illustrated in FIG. 11 and described below, one or more firewalls may be configured based on the generated firewall rules at a step 1115.

Firewall rules may use symbols to refer to addresses. For each firewall, a symbol table covering all symbols referenced by its rules may be sent to the output stage, which may then use it to produce definitions that can be loaded into the firewall.

Firewalls may be placed in device groups. The firewall compiler builds symbol tables for each device group and directs rules to individual firewalls.

The foregoing describes how the firewall compiler 900 operates for the case of discrete firewalls, i.e., when firewall functionality is implemented in dedicated devices. In the case of distributed firewalls, firewall functionality may be logically implemented at each VM.

For example, in AWS, security groups specify allowable ingress and egress traffic based on source and destination IP address and port. A VM's network interface may join one or more groups.

A firewall compiler may translate a set of flows to a set of security groups, one for each network interface. If type(X), net(X), ip(X) give the VM type, network, and actual IP address associated with address expression X, respectively, the flow src→dst app proto/port would contribute an egress rule to security group type(src) net(src):
  type(dst) proto/port out
and an ingress rule to security group type(dst) net(dst):
  type(src) proto/port in
For example, the three flows would be translated to the following security groups in AWS:
  SBCRW_SBC_B2:
  udp/20000-59999 in
  SBCRW_SBC_A1:
  AMS_AMS udp/6000-32598 out
  AMS_AMS:
  SBCRW_SBC_A1 udp/6000-32598 in
  WDC_APPS:
  tcp/443 out While the above discussion relates to flows written by users, it should be appreciated the same systems and methods as described herein may be used to configure firewalls and create firewall rules based on flows automatically generated by machine. For example, in some embodiments, a set of entities, such as VMs, in operation may be observed.

Each observation may contain data such as a specific source address and destination address for each connection between entities within a network or system. The source address and destination addresses may be reverse resolved to VM type and address identifier (e.g., 10.0.0.90 is WDC.i-p_address_1). Together with the destination port number, a rudimentary flow, e.g., src.x→dst.y any tcp/port, may be automatically generated by a computer system based on the information observed by tracking communication between entities such as VMs. It should be appreciated that several observations can give rise to the same flow and no unnecessary rules may be created.

In this way, a set of VMs in operation may be observed by a computer system which may be configured to collect data relating to which element is communication with which other element. For example, a computer system may both observe VMs in operation and execute a firewall compiler 900.

Protocols that use a range of ports, such as RTP, may in some embodiments require extra handling. For example, observing a packet whose destination port falls within a particular range may give rise to a flow covering the entire range, e.g., src.x→dst.y any udp/port_0-port_f.

In some embodiments, the process of observing how VMs, or other entities, communicate may comprise temporarily programming all firewalls to allow all traffic, to log the traffic, and then analyze the logged traffic. Some firewalls, e.g., Palo Alto, may be capable of identifying the protocol as well, which may result in a flow more specific than "any."

It should also be appreciated that flows can be collected in one environment and translated via firewall compilation into firewall rules which may be applied to firewalls of different types in any number of different computing environments.

A firewall compiler 900 as described herein is capable of generating firewalls for a given set of flows regardless of the vendor or type of firewall being used within a system. For example, firewalls of different vendors may have different syntax and capabilities and thus require different rules. The firewall compiler 900 may be configured to generate specific rules for a particular firewall based on the vendor of the firewall using the output stages 918, 921, 924, 927 of the second stage 906 of the firewall compiler 900 as illustrated in FIG. 9.

In the case of a network or system in which a distributed firewall is used, a firewall compiler 900 may output a set of rules for each type of VM rather than a set of rules for each firewall. In this way, a firewall compiler 900 may be configured to output sets of rules for firewalls of different classes, i.e., discrete firewalls and distributed firewalls using different firewall rule generators 909, 915 as illustrated in FIG. 9. Discrete firewalls may be, for example, Palo Alto or Juniper firewalls, while distributed firewalls may be, for example, an AWS security group.

A firewall compiler as described herein may be configured to generate firewall rules based on wiring of entities within a network or computing system. A firewall compiler may generate a different set of rules given a same set of flows based on different wiring of entities. To continue the above example flow of
RTP_IN_1:
INTERNET→SBCRW.registrar_B2_publicip_sm1 rtp udp/20000-59999
nat: dst registrar_B2_ip_sm1
RTP_IN_2:
SBCRW.inside_A1_ip_rw→AMS.ip_address_1 rtp udp/6000-32598
WEB: WDC.ip_address_1→INTERNET https tcp/443,
if SBCRW and AMS share a common media network, the second flow in would compile to no rule as no firewall rule would be required. In this way, the firewall 900 compiler may avoid the creation of unnecessary rules while ensuring the firewalls within computing environment allow for a proper flow of data.

A firewall compiler 900 may be configured to generate a set of rules based on a server, VM, or other entity, population configuration. For example, for the following flow,
RTP_IN_1:
INTERNET→SBCRW.registrar_B2_publicip_sm1 rtp udp/20000-59999
nat: dst registrar_B2_ip_sm1,
a NAT rule would be emitted for each pair of SBCRW. In some embodiments, configurations, e.g., a number of VMs of each type, may be a function of the size of the user population or may be due to selectable options in the design. The firewall compiler 803 or 900 may in some embodiments receive an address feed 818 from an automation system 815 such as Maestro. In some embodiments, the automation system 815 and the firewall compiler 803 or 900 may be designed to have compatible data models.

In some embodiments, a firewall compiler may be configured to select relevant flows from a received set of flows based on information from an automation system. For example, information from the automation system may indicate which particular types of VMs are being deployed. Based on the types of VMs being deployed, the firewall compiler may select any flows from a received set of flows relevant to the particular types of VMs being deployed. When generating rules for a given flow for discrete firewalls, the firewall compiler may be configured to first determine which firewalls in the topology will be involved.

As described herein, given one set of flows, a firewall compiler 900 may generate a variety of different results based on factors such as VM or server population configurations, network wiring diagrams, types of VMs or other entities within the network, and the types of vendors of the firewalls within the computing environment. In this way, solution architects may be enabled to write flows or abstract descriptions of communications which should be allowed through a network or computing environment and, through the use of a firewall compiler 900 as described herein, receive a properly configured set of firewalls without being required to know or input data associated with particular details of any network for which the flows were written.

It should be appreciated that using the systems and methods described herein, a solution architect may be enabled to write a single set of flows which may be used to configure firewalls in any number of networks of different topologies and including different types of firewalls and computing entities such as servers and VMs.

As described herein, a solution architect may be enabled to write a set of flows which capture the intent of a design. Using such flows, a firewall compiler 900 as described herein may be configured to automatically implement the design in a specific context without requiring additional input from the solution architect such as by using a method 1100 as described below.

The traditional workflow of taking a working set of rules from one context and manually transforming it for use in another as used in conventional methods of configuring firewalls is very slow and error-prone (particularly in the case of NAT rules), and results in rule sets enriched with unnecessary rules over time (e.g., access to PCI domains from inexplicable address ranges).

Rules created using conventional methods often include additional items in contravention of a design's security architecture, whether due to a user's lack of expedience, lack of understanding, or misattribution of other problems to firewall blockage. Furthermore, rule sets developed for one data center design cannot be readily converted to another. Rules created using conventional methods are often written in a broad manner (e.g., let everything on a particular subnet through) rather than as tightly as required (e.g., only these specific addresses should be allowed), trading off security against manual efforts.

The disclosed systems and methods of firewall compilation reduce what used to take days of work followed by weeks of debugging to something that can be done correctly the first time in minutes. Furthermore, using a system and method as described herein, any number of systems may be deployed in a timely manner based on the same set of information and without requiring any additional human interaction. As described above, a firewall compiler may be configured to translate an abstract description of allowable traffic, i.e., flows, to one or more command streams. Command streams can be used to program actual firewalls by establishing firewall rules. Abstract, as used herein, may refer to one or more of: independent of system instantiation, i.e., actual IP addresses and/or number of VMs of each type; firewall topology, i.e., distributed versus discrete, a set of subnets connected to a firewall, and zone assignment; and firewall vendor. Flows are invariant and may be prescriptive.

It should be appreciated, firewall compilation as described herein may be implemented for computing devices other than VMs, such as media servers or other types of computing devices. In fact, the source and destination in production flows can involve networks and external servers, for example:
APPS,AMS,CC_APPS<=>TWIN/APPS,TWIN/AMS, TWIN/CC_APPS any,
where APPS, AMS, and CC_APPS refer to subnets, and TWIN refers to a partner data center.

A firewall compiler may be configured to generate rules for distributed firewalls based on flows. For example, a security group may comprise rules that allow incoming connections from certain sources and outgoing connections to certain destinations. The firewall compiler may be configured to process each flow of a set of flows.

As described herein, one set of abstract flows can be compiled into a plurality of sets of rules without modification. In practice, flows may be written top-down as part of a network design for, example, a data center. Flows may also be written bottom-up for example from examination of blocked traffic from firewall logs.

In accordance with one or more of the embodiments described herein, a method 1100 of automatically configuring a firewall may be implemented as illustrated in FIG. 11 and described below.

Such a method 1100 may be performed by a user device such as a computer system, laptop, smartphone, server, etc., and the method may be stored in a computer program product comprising computer-readable storage medium with computer-readable program code embodied therewith configured to, when executed by a processor of a computer system, perform functions as described herein.

For example, the method 1100 may be performed by a controller 140 within a system 100 and may be used to configure one or more of the firewalls 120A-D as illustrated in FIG. 1. The method 1100 may also or alternatively be performed by a combination of elements including one or more of the user devices 101A,B,N and/or controller 140. Furthermore, the method 1100 may be performed before any VMs are deployed and even before any firewalls 120A-D are established.

The computer system executing the method 1100 may be a computer system 200 as illustrated in FIG. 2 and may comprise one or more processors 202, memory 208, input/output devices 214, a storage drive 206, etc. As illustrated in FIG. 8, the computer system may function as a firewall compiler 803 and may accept as inputs one or more flows 806, a wiring 809, a firewall topology 812, and an address feed 818 such as one generated by an automation system 815. The computer system may be configured to output one or more rules 821 which may be used to configure one or more firewalls 824. As illustrated in FIG. 9, the computer system, operating as a firewall compiler 903, may comprise a rule generator 909 for discrete firewalls and a rule generate 915 for distributed firewalls.

The method 1100 may begin at 1103 in which a computer system such as controller 140 or a user device 101A,B,N comprising one or more processors is set to receive flows and determine one or more elements of a computing environment such as the system 100 as described herein.

At 1106, the computer system receives one or more flows. In some embodiments, the flows may be input by a user of the computer system or a user of another computer system in communication with the computer system performing the method 1100. For example, the flow or flows may be input by a user such as a solution architect designing a network for which one or more firewalls should be configured. Flows may be written in such a way as to indicate allowable flows of data between computing devices. It should be appreciated that one set of flows may be used to configure any number of firewalls in any number of computing environments. As such, the method 1100 may be run in parallel with any number of other similar methods to configure any number of firewalls in any number of computing environments with the same set of flows.

At 1109, the computer system automatically detects elements of a computing environment. For example, to configure a firewall 120A-D as illustrated in FIG. 1, the computer system may detect elements such as the virtual machines 110A-D, the firewalls 120A-D, the controller 140, and/or user devices 101A,B,N.

In some embodiments, the computer system may detect the elements based on a wiring which describes the firewalls, VMs, media servers, and other elements which may be deployed within the computing environment. In some embodiments, detecting the elements of the computing environment may comprise detecting one or more media servers or other types of servers within the computing environment.

It should be appreciated that the elements of the computing environment may be detected prior to the computing environment being deployed, that is, prior to the VMs or other computing elements being installed. Detecting the elements of the computing environment may further comprise determining, for each firewall within the computing environment, a firewall type, vendor name, etc. Furthermore, detecting the elements of the computing environment may comprise detecting only the elements of the computing environment which are affected by the one or more flows received at 1106.

In some embodiments, the method may further comprise receiving an address feed. The firewall configuration may then be generated further based on the address feed. An address feed may be received by the computer system from an automation system. In some embodiments, the computer system may request addresses associated with each of the elements detected in step 1109 from an address feed provider. In some embodiments, an automation system in communication with the computer system may be configured to fulfill VM queries or other types of queries which may be used to provide the address feed to the computer system.

In some embodiments, the elements of the computing environment may be detected by the computer system accessing a firewall arrangement or topology which may describe types of firewalls within the environment, arrangement of firewalls within zones in the environment, and/or other information.

At 1112, the computer system automatically generates a firewall configuration based on the detected elements of the computing environment and the received one or more flows.

Generating a firewall configuration may comprise generating a plurality of firewall rules based on the received one or more flows, the firewall arrangement or topology, and/or the detected elements of the computing environment.

For example, given a firewall topology, the computer system may be configured to translate the received one or more flows into a set of firewall rules for a particular firewall within the environment. In some embodiments, the firewall rules may be generated for a specific population of VMs according to an address feed.

At 1115, the computer system automatically configures a firewall within the computing environment with the firewall configuration. After generating the rules at 1112, the computer system may direct the rules to individual firewalls. In some embodiments, the computer system may use a firewall configuration software application to input the generated rules such that the firewalls may be properly configured.

In some embodiments, firewall rules may be generated prior to deploying a virtual machine and/or deploying or installing firewalls within the environment. The firewalls may thus be configured at or before the time of deployment. It should be appreciated the same one or more flows received at 1106 may be used to configure any number of firewalls within any number of computing environments.

At 1118, the method 1100 may end with the firewall configured. It should be appreciated the method 1100 may be used to configure any number of firewalls of various types based on the same or similar flows.

In some embodiments, a firewall compiler as described herein may be integrated with an automated deployment system such as Maestro™. The firewall compiler and the automated deployment system may share a common vocabulary. Such a system may be used for VMs deployed by the automated deployment system as well as for subnets and servers that exist in the automated deployment system's environment. Conventional methods of performing address resolution manually is extremely laborious and error-prone. When a flow refers to an entity, for example, X.addr, the firewall compiler may be enabled to query the entity and resolve it to, for example, the set of addr on all VMs of type X that will be deployed by the automated deployment system.

To avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method of automatically configuring a firewall, the method comprising:
   receiving, by one or more processors, one or more flows between computing devices;
   automatically detecting, by the one or more processors, hardware elements of a computing environment, wherein detecting the hardware elements of the computing environment comprises detecting the number of servers of a particular type within the computing environment;
   automatically generating a firewall configuration based on the automatically detected hardware elements of the computing environment and the received one or more flows; and
   automatically configuring the firewall within the computing environment with the firewall configuration.

2. The method of claim 1, wherein the one or more flows indicate allowable flows of data between the computing devices.

3. The method of claim 1, further comprising generating firewall rules and initializing firewalls prior to deploying a virtual machine.

4. The method of claim 1, wherein generating the firewall configuration comprises generating a plurality of firewall rules based on the received one or more flows.

5. The method of claim 1, further comprising configuring a second firewall within a second computing environment based on the one or more flows.

6. The method of claim 1, further comprising receiving, by the one or more processors, an address feed, wherein the firewall configuration is generated further based on the address feed.

7. The method of claim 1, wherein the one or more flows comprise a source of at least one flow of the one or more flows and a destination of the flow of the one or more flows.

8. A user device comprising:
   a processor; and
   a computer-readable storage medium storing computer-readable instructions which, when executed by the processor, cause the processor to:
   receive one or more flows;
   automatically detect hardware elements of a computing environment, wherein detecting the hardware elements of the computing environment comprises detecting the number of servers of a particular type within the computing environment;
   automatically generate a firewall configuration based on the automatically detected hardware elements of the computing environment and the received one or more flows; and
   automatically configure a firewall within the computing environment with the firewall configuration.

9. The user device of claim 8, wherein the one or more flows indicate allowable flows of data between computing devices.

10. The user device of claim 8, wherein the computer-readable instructions further cause the processor to generate firewall rules and initialize firewalls prior to deploying a virtual machine.

11. The user device of claim 8, wherein generating the firewall configuration comprises generating a plurality of firewall rules based on the received one or more flows.

12. The user device of claim 8, wherein the computer-readable instructions further cause the processor to configure a second firewall within a second computing environment based on the one or more flows.

13. The user device of claim 8, wherein the computer-readable instructions further cause the processor to receive an address feed, wherein the firewall configuration is generated further based on the address feed.

14. A computer program product comprising:
   a non-transitory computer-readable storage medium having computer-readable program code embodied therewith, the computer-readable program code configured, when executed by a processor, to:
   receive one or more flows;
   automatically detect hardware elements of a computing environment, wherein detecting the hardware elements of the computing environment comprises detecting the number of servers of a particular type within the computing environment;
   automatically generate a firewall configuration based on the automatically detected hardware elements of the computing environment and the received one or more flows; and
   automatically configure a firewall within the computing environment with the firewall configuration.

15. The computer program product of claim 14, wherein the one or more flows indicate allowable flows of data between computing devices.

16. The computer program product of claim 14, wherein the computer-readable program code is further configured to generate firewall rules and initialize firewalls prior to deploying a virtual machine.

17. The computer program product of claim 14, wherein generating the firewall configuration comprises generating a plurality of firewall rules based on the received one or more flows.

18. The computer program product of claim 14, wherein the computer-readable program code is further configured to configure a second firewall within a second computing environment based on the one or more flows.

19. The computer program product of claim 14, wherein the computer-readable program code is further configured to receive an address feed, wherein the firewall configuration is generated further based on the address feed.

20. The computer program product of claim 14, wherein the one or more flows comprise a source of at least one flow of the one or more flows and a destination of the flow of the one or more flows.

* * * * *